(12) United States Patent
Wilkinson

(10) Patent No.: US 8,286,887 B2
(45) Date of Patent: Oct. 16, 2012

(54) RFID TAG SENSORS AND METHODS

(75) Inventor: Bruce W. Wilkinson, Rogers, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 141 days.

(21) Appl. No.: 12/884,097

(22) Filed: Sep. 16, 2010

(65) Prior Publication Data

US 2011/0012713 A1 Jan. 20, 2011

Related U.S. Application Data

(63) Continuation-in-part of application No. 12/721,527, filed on Mar. 10, 2010.

(60) Provisional application No. 61/159,042, filed on Mar. 10, 2009.

(51) Int. Cl.
*G06K 19/06* (2006.01)
(52) U.S. Cl. .......................... 235/492; 235/451; 235/488
(58) Field of Classification Search .................. 235/492, 235/488, 451; 340/572.7–572.9
See application file for complete search history.

(56) References Cited

U.S. PATENT DOCUMENTS

| | | | |
|---|---|---|---|
| 5,376,778 A | 12/1994 | Kreft | |
| 6,641,036 B1 | 11/2003 | Kalinowski | |
| 6,894,660 B2 | 5/2005 | Sanogo | |
| 6,946,951 B2 | 9/2005 | Cole et al. | |
| 6,992,567 B2 | 1/2006 | Cole et al. | |
| 7,170,415 B2 | 1/2007 | Forster | |
| 7,187,267 B2 | 3/2007 | Cole | |
| 7,187,288 B2 | 3/2007 | Mendolia et al. | |
| 7,205,896 B2 | 4/2007 | Wu et al. | |
| 7,221,259 B2 | 5/2007 | Cole | |
| 7,528,726 B2 | 5/2009 | Lee et al. | |
| 7,642,917 B2 | 1/2010 | Tran | |

(Continued)

FOREIGN PATENT DOCUMENTS

JP 2004-046904 2/2004

(Continued)

OTHER PUBLICATIONS

"EPC™ Radio-Frequency Identity Protocols Class-1 Generation-2 UHF RFID Protocol for Communications at 860 MHz-960 MHz Version 1.0.9;" Specification for RFID Air Interference by EPCglobal Inc.; 94 pages; Jan. 2005.

(Continued)

*Primary Examiner* — Ahshik Kim
(74) *Attorney, Agent, or Firm* — Fitch, Even, Tabin & Flannery, LLP

(57) ABSTRACT

Radio frequency identification (RFID) devices for use in RFID-based sensors and related methods are described herein. In one implementation, an RFID sensor system includes an RFID device having a near field only RFID tag and a conductive element which functions as a far field antenna. A coupling structure selectively locates the near field only RFID tag and the conductive element in at least a first position and a second position relative to each other; wherein in the first position, the RFID device only operates in a near field, and in the second position, the RFID device operates in both the near field and a far field. The system may also include an RFID reader and controller located within the far field to read the RFID device only when the coupling structure locates the components in the second position.

34 Claims, 17 Drawing Sheets

U.S. PATENT DOCUMENTS

| | | |
|---|---|---|
| 7,762,472 B2 | 7/2010 | Kato |
| 7,812,729 B2 | 10/2010 | Copeland |
| 7,880,620 B2 | 2/2011 | Hatori et al. |
| 2004/0046643 A1 | 3/2004 | Becker et al. |
| 2006/0145710 A1 | 7/2006 | Puleston et al. |
| 2006/0158311 A1 | 7/2006 | Hall et al. |
| 2007/0096915 A1 | 5/2007 | Forster et al. |
| 2007/0164868 A1 | 7/2007 | Deavours et al. |
| 2007/0290856 A1 | 12/2007 | Martin |
| 2008/0048834 A1 | 2/2008 | Lenevez |
| 2008/0088459 A1 | 4/2008 | Martin et al. |
| 2008/0094181 A1 | 4/2008 | Lenevez et al. |
| 2008/0116256 A1 | 5/2008 | Martin et al. |
| 2008/0129512 A1 | 6/2008 | Bielas et al. |
| 2008/0129513 A1 | 6/2008 | Bielas et al. |
| 2009/0008460 A1 | 1/2009 | Kato |
| 2009/0027208 A1 | 1/2009 | Martin et al. |
| 2009/0108993 A1 | 4/2009 | Forster |
| 2009/0206995 A1 | 8/2009 | Forster |
| 2010/0001079 A1 | 1/2010 | Martin et al. |
| 2010/0045025 A1 | 2/2010 | Cote et al. |
| 2010/0079245 A1 | 4/2010 | Perng et al. |
| 2010/0079287 A1* | 4/2010 | Forster et al. .............. 340/572.3 |
| 2010/0230500 A1 | 9/2010 | Wilkinson |

FOREIGN PATENT DOCUMENTS

| | | |
|---|---|---|
| JP | 2008-158569 | 7/2008 |
| WO | WO 2010-104991 A2 | 9/2010 |

OTHER PUBLICATIONS

Nikitin et al.; *An Overview of Near Field UHF RFID*; Feb. 2007; 8 pages; IEEE.

PCT; App. No. PCT/US2010/026882; International Search Report mailed Oct. 26, 2010.

PCT; App. No. PCT/US2010/026882; Written Opinion mailed Oct. 26, 2010.

RFIDSOUP.com; *RFID Soup*; Mar. 6, 2009; 12 pages; published at http://rfidsoup.pbwiki.com.

Swedberg, Claire; *RFID Puts Salt Lake City Drivers in the Fast Lane*; RFID Journal; Oct. 1, 2010; 5 pages; published at http://www.rfidjournal.com/article/view/7907.

TAGSENSE.COM, *TagSene Frequently Asked Questions*; Mar. 6, 2009; 3 pages; published at www.tagsense.com/ingles/faq/faq.html.

TECHNOVELGY.COM; *Passive RFID Tag (or Passive Tag)*; Mar. 5, 2009, 5 pages; published at www.technovelgy.com.

WIKIPEDIA, *RFID*; Mar. 6, 2009; 2 pages; published at http://rfidsoup.pbwiki.com.

"EPC™ Radio-Frequency Identity Protocols Class-1 Generation-2 UHF RFID Protocol for Communications at 860 MHz-960 MHz Version 1.0.9;" Specification for RFID Air Interface by EPCglobal Inc.; 94 pages, Jan. 2005.

PCT; App. No. PCT/US2011/051763; International Search Report mailed Feb. 21, 2012.

PCT; App. No. PCT/US2011/051763; Written Opinion mailed Feb. 21, 2012.

USPTO; U.S. Appl. No. 12/721,527; Office Action mailed Feb. 16, 2012.

USPTO; U.S. Appl. No. 12/721,527; Applicant-Initiated Interview Summary mailed May 4, 2012.

* cited by examiner

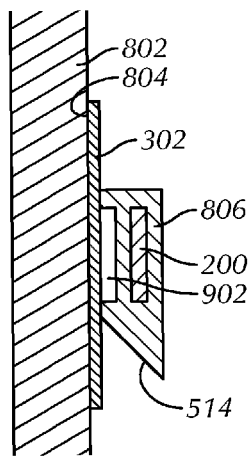
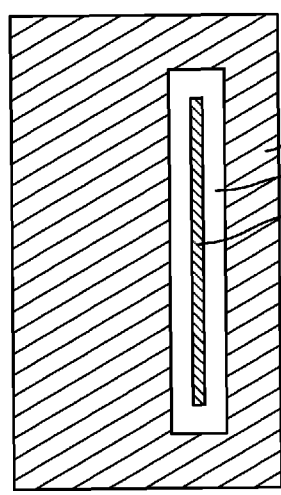
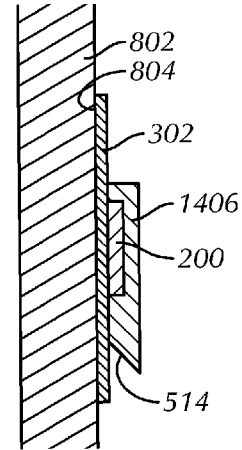
FIG. 9   FIG. 10   FIG. 14
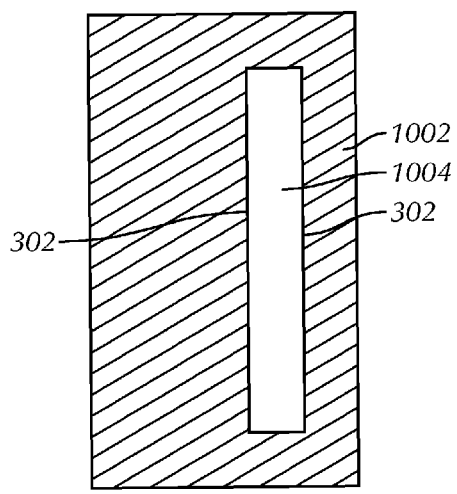
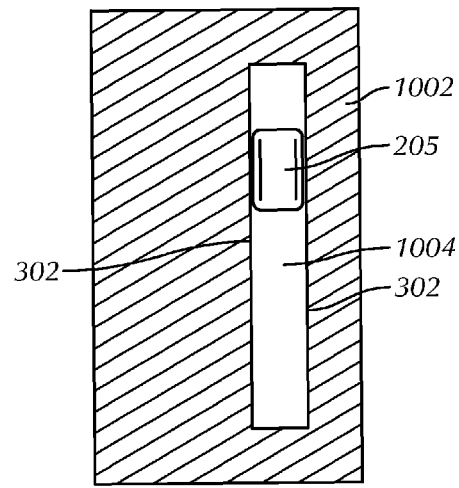
FIG. 15   FIG. 16

RFID TAG SENSORS AND METHODS

This application is a continuation-in-part of U.S. application Ser. No. 12/721,527, filed Mar. 10, 2010, entitled UNIVERSAL RFID TAGS AND MANUFACTURING METHODS, which claims the benefit of U.S. Provisional Application No. 61/159,042, filed Mar. 10, 2009, both of which are incorporated in their entirety herein by reference.

BACKGROUND OF THE INVENTION

1. Field of the Invention

The present invention relates generally to radio frequency identification (RFID) tags, and more specifically to RFID tags suitable for use in near and far range applications.

2. Discussion of the Related Art

A radio frequency identification (RFID) tag is an object that can be applied to or incorporated into a product, animal, or person for the purpose of identification and tracking using radio waves. Some tags can be read from several meters away and beyond the line of sight of the reader. Most RFID tags contain at least two parts. One is an integrated circuit for storing and processing information, modulating and demodulating a radio-frequency (RF) signal, and other specialized functions. The second is an antenna for receiving and back-scattering the signal. There are generally two types of RFID tags: active RFID tags, which contain a battery, and passive RFID tags, which have no battery. Today, RFID is used in enterprise supply chain management to improve the efficiency of inventory tracking and management.

Wal-Mart and the U.S. Department of Defense have published requirements that their vendors place RFID tags on all shipments to improve supply chain management. Typically, vendors use RFID printer/encoders to label cases and pallets that require electronic product code (EPC) tags. These smart labels are produced by embedding RFID inlays inside the label material, and then printing bar code and other visible information on the surface of the label.

However, vendors face significant difficulties implementing RFID systems. For example, the successful read rates currently run only 80%, due to radio wave attenuation caused by the products and packaging. That is, the RF characteristics and performance of a RFID UHF passive tag vary depending on the dielectric properties of the object it is placed on. Tag inlay manufacturers attempt designing tags that are the least effected by the object's dielectric. The dielectric of the item the tag is attached to changes the resonate frequency of the inlay's antenna. In order for the RF signal to get to the integrated circuit there has to be an impedance matching between the antenna and the chip. The more the antenna is detuned, the greater the impedance is mismatched. The tag's performance degrades as the impedance mismatch increases until the tag stops working.

Inlay manufacturers have had only moderate success at designing "universal tags" that will reliably function for all uses. The alternative is to design specific tags for specific types of product. As a further challenge, vendors will need to design tags that will meet tag certification which requires a particular tag be used for proper performance so that the tag can be read under many varying conditions through out the supply chain. This will lead to even more product specific tag designs.

Additionally, the manufacturers of consumer products will have to keep inventory of all the different tags that are required to sell their products. The right tag for a particular stock keeping unit (SKU) will have to be added to the Bill of Materials as a component and be managed through Materials Requirements. Planning (MRP). This adds one more link that can potentially stop the productions line for that SKU. There will be great pressure to substitute a different non-certified tag in order to keep the production line moving which will cause inventory inaccuracies down the supply chain. The burden to the supply chain both in cost and complexity creates a head wind that suppliers to retailers that require RFID tagging have to overcome.

SUMMARY OF THE INVENTION

Several embodiments of the invention provide radio frequency identification (RFID) devices for use as RFID-based sensors, and related methods.

In one embodiment, a radio frequency identification (RFID) sensor system comprises an RFID device comprising: a near field only RFID tag, wherein the near field only RFID tag in and of itself does not function as a far field RFID tag; a conductive element independent from the near field only RFID tag and configured to function as a far field antenna; and a coupling structure coupled to the near field only RFID tag and the conductive element, wherein the coupling structure is configured to selectively locate the near field only RFID tag and the conductive element in at least a first position and a second position relative to each other. The first position locates the near field only RFID tag and the conductive element relative to each other such that the conductive element is sufficiently decoupled from the near field only RFID tag in order that the RFID device only operates in a near field with respect to an RFID reader. And the second position locates the near field only RFID tag and the conductive element relative to each other such that the conductive element is sufficiently coupled to the near field only RFID tag such that the RFID device operates in both the near field and a far field with respect to the RFID reader.

In another embodiment, a method for using a radio frequency identification (RFID) device as a sensor comprises: locating a near field only RFID tag and a conductive element of an RFID device at one of a first position and a second position relative to each other, wherein the near field only RFID tag in and of itself does not function as a far field RFID tag, wherein the conductive element is configured to function as a far field antenna, wherein the first position locates the near field only RFID tag and the conductive element relative to each other such that the conductive element is sufficiently decoupled from the near field only RFID tag in order that the RFID device only operates in a near field with respect to an RFID reader, wherein the second position locates the near field only RFID tag and the conductive element relative to each other such that the conductive element is sufficiently coupled to the near field only RFID tag such that the RFID device operates in both the near field and the far field with respect to the RFID reader; and locating the near field only RFID tag and the conductive element at another of the first position and the second position relative to each other.

BRIEF DESCRIPTION OF THE DRAWINGS

The above and other aspects, features and advantages of several embodiments of the present invention will be more apparent from the following more particular description thereof, presented in conjunction with the following drawings.

FIG. 9 is a cross sectional view of another implementation of a decoupled near field only RFID tag and far field antenna as affixed to an item including an air gap maintained between the near field tag and the far field antenna in accordance with one embodiment.

FIG. 10 is an illustration of a portion of an item packaging in which a far field antenna is formed on a surface of the item packaging in accordance with one embodiment.

FIG. 14 is a cross sectional view of another implementation of a decoupled near field only RFID tag and far field antenna as affixed to an item in accordance with one embodiment.

FIG. 15 is an illustration of a portion of an item packaging in which a far field antenna is formed on a surface of the item packaging in accordance with a variation of the embodiment of FIG. 10.

FIG. 16 is one embodiment of the portion of the item packaging of FIG. 15 including a near field only RFID tag capacitively coupled to the far field antenna.

Figure 1:
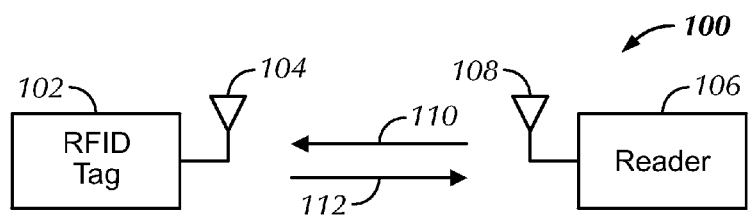
FIG. 1 is a diagram illustrating the basic components of an RFID system including a passive RFID tag and tag reader as is conventionally known.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

According to several embodiments, the design of the near field RFID tag component and the far field antenna of a typical RFID tag is decoupled. For example, in one embodiment, the design of the near field RFID tag component is independent of the design of the far field antenna that will be used together with the near field RFID tag component. In some forms, this will allow a vendor to design or select the best or most cost effective near field only RFID tag without regard for the design of the far field antenna, and vice versa. Furthermore, when designing RFID tags according to some embodiments, a vendor can use a single near field only RFID tag for all uses, which leads to economies of scale lowering the cost of tagging items to the vendor. Additionally, the design of the far field antenna is simplified when it does not have to be integrated into the same substrate package as the near field only RFID tag. For example, according to some embodiments, a near field only RFID tag that does not include a far field antenna and does not function as a far field RFID tag is mass produced by a tag manufacturer and purchased by the item designer and/or manufacturer who designs, manufactures, or has manufactured the far field antenna which is substantially tuned to the item. In many cases, the result is a cost effective and efficient RFID tag that functions as both in the near field tag and the far field and is substantially tuned to the item to be tagged.

Generally, referring to FIGS. 1-17 and corresponding description, various RFID devices having a decoupled near field only RFID tag and far field antenna and related methods according to some embodiments are described. Additionally, referring to FIGS. 18-36, RFID sensors, systems and methods are described in which RFID devices with decoupled near field only RFID tags and far field antennas are used to implement RFID sensors in accordance with some embodiments.

Referring first to FIG. 1, a diagram is shown of the basic components of an RFID system 100 including a passive RFID tag 102 and a tag reader 106 as is conventionally known. The RFID tag 102 is formed on a substrate and includes an integrated circuit or chip (not shown) for storing and processing information, modulating and demodulating a radio-frequency (RF) signal, and other specialized functions. The RFID tag 102 also includes a tag antenna 104. In a passive system, the reader 106 includes a reader antenna 108 and transmits a modulated radio frequency (RF) signal 110 to the RFID tag 102. The tag antenna 104 receives the RF signal and forms an electric and magnetic field from which the RFID tag 102 draws power for the integrated circuit. The integrated circuit then causes the RFID tag 102 to modulate a backscatter RF signal 112 back to the tag reader 106, the RF signal containing information encoded in the memory of the RFID tag 102. This is referred to as backscattering in that a portion of the energy transmitted by the reader 106 is reflected by the tag antenna 104 and modulated with data. Both the RFID tag 102 and the tag reader 106 are transponders. The functionality and operation of the system 100 of FIG. 1 is well known.

Most RFID tags designed for use in enterprise supply chain management are designed as both near field and far field RFID tags, i.e., they are designed to operate in both the near field and the far field. As understood in the art, the near field and the far field are a function of the frequency of electromagnetic energy received at an RFID tag (e.g., from interrogation signals transmitted by RFID readers) and backscattered by the RFID tag. The near field is the region about the tag 102 relative to the reader antenna 108 where the reader antenna 108 and the tag 102 are coupled within one full wavelength of the carrier wave; however, in many practical applications, the near field is within one half wavelength of the carrier wave. The near field signal decays as the cube of the distance r from the reader antenna ($1/r^3$). The far field is that region about the tag 102 relative to the reader antenna 108 where the reader antenna 108 and the tag 102 are coupled beyond one full wavelength of the carrier wave. The far field signal decays as the square of the distance r from the reader antenna ($1/r^2$). In a typical ultra-high frequency (UHF) RFID system where the carrier frequency is in the range of 860-960 MHz, the effective near field is the region up to approximately 10-15 centimeters from the reader antenna 108, whereas the far field is the region from approximately 15-40 centimeters and beyond the reader antenna 108. In many cases, the reader 106 can read in the near field up to about 15 centimeters away, whereas depending on the tag antenna, the reader 106 can read in the far field up to about 20-30 feet or more away. For example, with the use of semi-passive tags, the far field may reach up to 100 feet or more. These features are also well known in the art. It is understood that the near field only tag 200 may be designed to operate with reader antennas operating at a variety of frequencies, such as low frequency (LF) at 125-134 kHz, high frequency (HF) at 13.56 MHz, ultra high frequency (UHF) at 860-960 MHz, microwave frequencies at 2.4 and 5.8 GHz, for example.

Figure 18:
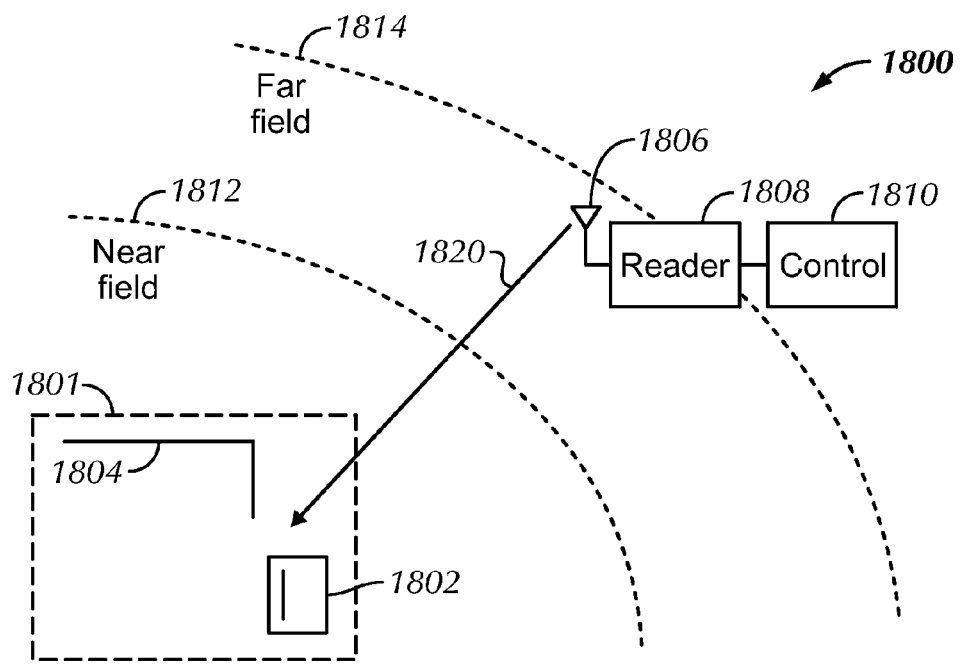
FIG. 18 is an illustration of an RFID sensor system in which a near field only RFID tag is decoupled with a far field antenna in accordance with some embodiments.
Figure 19:
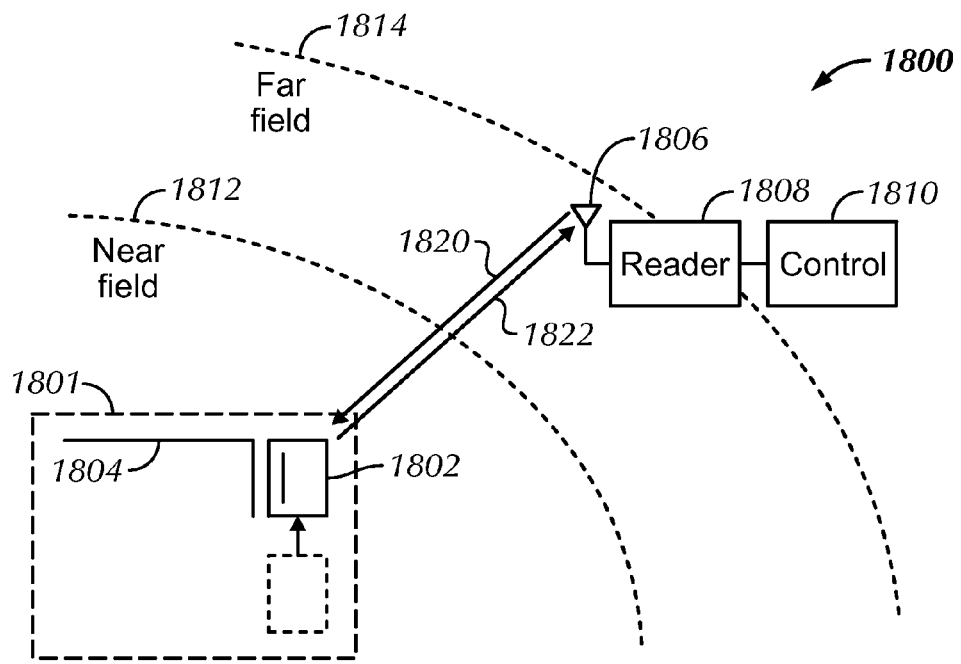
FIG. 19 is an illustration of the RFID sensor system of FIG. 18 in which the near field only RFID tag is moved relative to the far field antenna to be coupled with the far field antenna in accordance with some embodiments.
Figure 20:
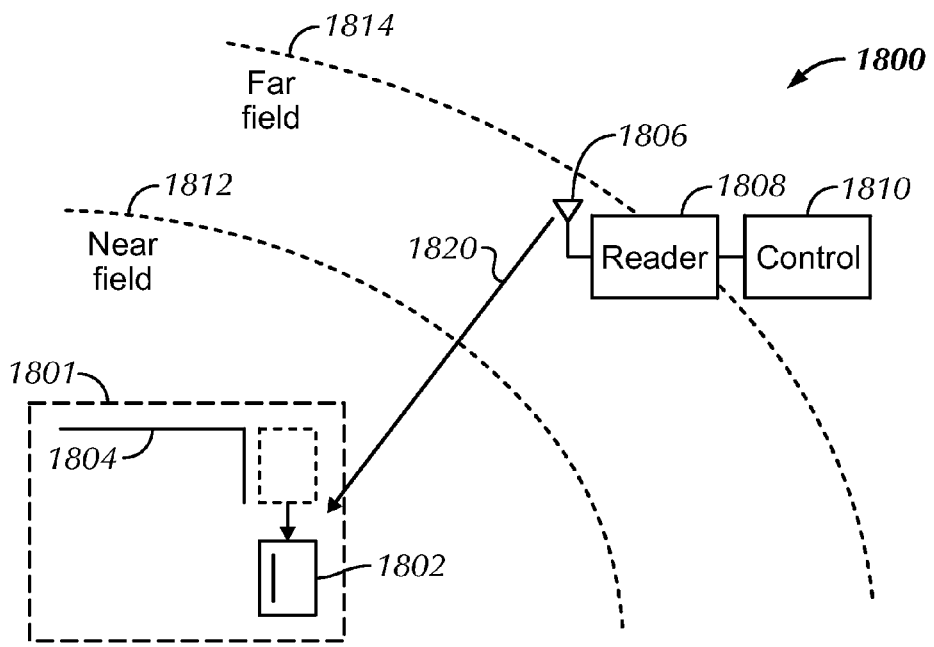
FIG. 20 is an illustration of the RFID sensor system of FIG. 18 in which the near field only RFID tag is moved relative to the far field antenna to again be decoupled with the far field antenna in accordance with some embodiments.

Another way to express a distinction between near field and far field communication is as follows, which is understood in the art. Given electromagnetic energy at a given frequency transmitted to a particular antenna element of the RFID tag, the near field is that portion of the region about the tag in which the electric field of oscillating electrons of the antenna element/s are not stripped off due to the oscillating energy. Thus, the far field is that region about the tag in which the electric field is stripped from the antenna element/s. That is, consider the viewpoint of a single stationary electron which has electric field lines radiating outward. That electron is moved or accelerated by the received energy oscillating at a frequency. As the electron moves back and forth, the electron's electric field lines will try to catch up with the electrons new location but they are limited by the speed of light on how fast they can catch up. This creates a ripple effect in the electric field. At low frequencies, the near field is very large because there is very little acceleration of the electron resulting in little rippling of the electric field lines. With little ripple effect, then there is little propagation and what remains is mostly near field. At ultra high frequency the electrons are accelerating back and forth creating a ripple effect in one direction and the back the other direction. This produces a sinusoidal electromagnetic wave that begins to propagate through space. The near field is generally ½ wave length within the region where the electric field lines can keep up with the electrons. This is the area where the electric field crosses from positive to negative and back again. Thus, generally, the faster the electrons are oscillated by the received signals from the reader, the shorter distance covered by the near field and the far field. FIGS. 18-20 provide simplified illustrations of the near field and the far field relative to an RFID tag device and an RFID reader.

In a typical enterprise supply chain management application, it is desired that the RFID tag 102 be a near field and far field tag to allow it to be read from the near field and the far field. The typical RFID tag 102 is an integrated package that includes an integrated circuit encoding an identification and a loop to give it the near field tag functionality. However, since this loop does not respond to the far field, the integrated package also includes a far field antenna or tag antenna that gives it the far field tag functionality. The typical far field antenna is a dipole antenna. The far field antenna is usually electrically coupled to the near field loop and the integrated circuit in most integrated RFID tags, but in some cases, the far field antenna is not electrically coupled to the near field loop or the integrated circuit and relies on inductive or magnetic coupling. The near field loop and the far field antenna are commonly printed or etched on the substrate as part of the same printing/etching process and then the integrated circuit is carefully placed thereon. The resulting integrated device is referred to as an RFID inlay.

There are several problems with this integrated design of the RFID tag 102. First, it is well known that dielectric properties of the item that the RFID tag is attached to affect the performance of the far field antenna. That is, the dielectric of the item may change the resonate frequency of the inlay's far field antenna. In order for the RF signal to get to the integrated circuit there has to be an impedance matching between the far field antenna, the loop and the chip. The more the far field antenna is detuned, the greater the impedance is mismatched. The tag's performance degrades as the impedance mismatch increases until the tag stops working. Certain products in a retail environment are known to possess dielectric qualities that make it challenging to design good performing RFID tags. For example, the cleanser Pine-Sol® results in the detuning of the far field antenna. Knowing this problem, the vendor can design the RFID tag 102 to tune the far field antenna so that the far field antenna will match the impedance with the chip and the loop when applied to the problem item. Typically, the length of the far field antenna is altered, e.g., shortened, to tune the antenna properly to the item it will be attached. However, due to the integration of the near field RFID tag and the far field antenna, in changing the far field antenna to be tuned to a particular item, the supplier will require a different integrated RFID tag for different products. Thus, in some embodiments, the design of the near field tag and the far field antenna need to account for each other. Again, this will cause suppliers to need to stock several different integrated RFID tags suitable for various products.

Figure 4A:
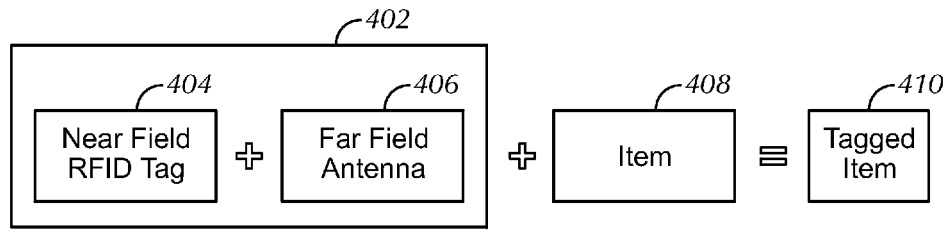
FIG. 4A is an illustration of a conventional manufacturing process used to create an RFID tag applied to an item.

Referring briefly to FIG. 4A, a conventional manufacturing process is shown for creating an RFID tag 402 to be applied to an item. The RFID tag 402 is first designed as an integration of a near field RFID tag 404 and a far field antenna 406 as described above (e.g., the near field loop and far field antenna are printed or etched on a substrate and the integrated circuit is positioned thereon). The design of the near field RFID tag 404 and the far field antenna 406 must account for each other and for the dielectric properties of the item 408 it will eventually be affixed to. Once the RFID tag 402 design is complete, the RFID tags are manufactured by or for the supplier and then applied to the item 408. In some cases, the RFID tag 402 is located on the under side of an adhesive sticker or other label and adhered to the item. In other cases, the RFID tag 402 integrated into the item or it's packaging during manufacturing of the item 408. In these cases, due to the harsh environment of manufacturing of the item (for example, due to printing, heat, high speed, etc.), it is common to damage the RFID tag 402. This makes it more difficult for a supplier or vendor to certify that the RFID tag will operate at an acceptable read rate. Finally, once the RFID tag 402 is added or affixed to the item 408, the result is a tagged item 410.

As a solution to one or more of the problems above and/or other problems, in some embodiments, the manufacturing and design of the near field RFID tag component is decoupled from or independent of the manufacturing and design of the far field antenna. In some embodiments, the goal is not to design a fully integrated and packaged RFID tag including both a near field RFID tag and the far field antenna on the same substrate. In several embodiments, a universal tag can be designed using only a simple pre-manufactured near field only RFID tag and a separate and independently designed electrically conductive element that will function as the far field antenna. Since the design of the two components will be separate, in some embodiments, the same near field only RFID tag can be used for all items or products to be tagged. To account for the varying degree of de-tuning effect caused by certain items or products, only the conductive element need be specifically designed. For example, in the case of a conductive element in the form of a simple wire, the length of the wire can be shortened to match the impedance of the far field antenna to the integrated circuit.

Figure 2A:
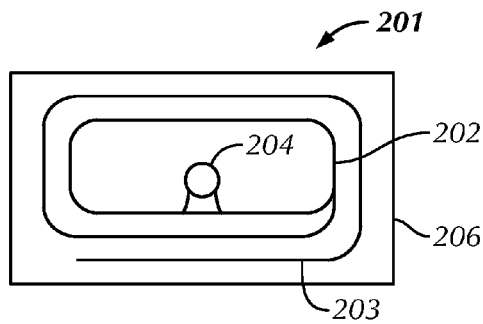
FIG. 2A is a diagram of an RFID tag including an integrated circuit chip and an antenna formed on a substrate as is conventionally known.

FIG. 2A illustrates a simple pre-manufactured RFID tag 201 including an integrated circuit 204 (or chip 204), a loop 202 and a tag antenna 203 (far field antenna) formed on a substrate 206 as is conventionally known. In one example, the RFID tag 201 is the Impinj® Paper Clip™ commercially available from Impinj, Inc. The RFID tag 201 functions as both a near field and far field RFID tag, i.e., it functions in and may be read from both the near field and the far field.

Figure 2B:
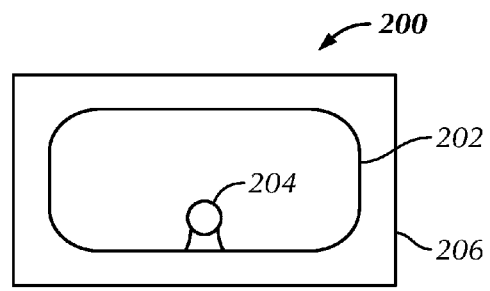
FIG. 2B is a diagram of a near field only RFID tag including an integrated circuit chip formed on a substrate according to one embodiment.

FIG. 2B illustrates a near field only RFID tag 200 including the integrated circuit 204 (or chip 204) and the loop 202 formed on the substrate 206, but lacking the tag antenna 203, in accordance with several embodiments. In one embodiment, the near field only RFID tag 200 may be formed by removing the tag antenna 203 of the device of FIG. 2A. In another embodiment, the near field only RFID tag may be pre-manufactured to not include the tag antenna 203. According to several embodiments, the near field only RFID tag 200 does not function as a far field RFID tag, i.e., on its own, it can not be read in the far field by a tag reader 106. In preferred embodiments, the loop 202 is designed, shaped and/or configured to be suitable for use with a far field antenna to be electromagnetically and/or electrically coupled thereto. This is in contrast to known pre-manufactured near field only RFID tags that are designed for use only in the near field. For example, the Impinj® Button™ is a near field only tag that has a chip with a circular loop and is not designed to be used with a far field antenna. Thus, this device is not designed for efficient coupling with a far field antenna. In some embodiments, the loop 202 is designed without a tag antenna 203 or far field antenna, but so that as described in more detail below, it will be later coupled to a separate tag antenna or a far field antenna in a separate manufacturing process. In some embodiments, the loop is designed in a generally rectangular shape with two elongated sides that assist in the generation of current from being magnetically coupled to a tag antenna.

It is understood that the near field only tag 200 may be designed to operate with reader antennas operating at a variety of frequencies, such as low frequency (LF) at 125-134 kHz, high frequency (HF) at 13.56 MHz, ultra high frequency (UHF) at 860-960 MHz, microwave frequencies at 2.4 and 5.8 GHz, for example.

Figure 2C:
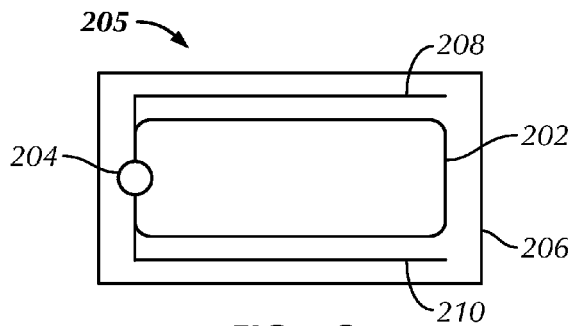
FIG. 2C is a diagram of a near field only RFID tag including an integrated circuit chip formed on a substrate to allow for capacitive coupling with a far field antenna according to another embodiment.

FIG. 2C is a diagram of a near field only RFID tag 205 including the integrated circuit 204 (or chip 204), the loop 202 and conductors 208 and 210 formed on the substrate 206 to allow for capacitive coupling with a far field antenna according to another embodiment. In operation, each of the conductors 208 and 210 can function as a first electrode of a capacitor formed between itself and a far field or tag antenna, where a portion of the far field antenna forms the second electrode of the capacitor. Electromagnetic energy from the tag reader 106 causes the voltage on the far field antenna (particularly at its end) to oscillate building a charge. This creates an oscillating potential difference at each elongated side of the tag 205, which causes a current to flow about the loop 202. This flowing current allows the chip 204 to operate and in turn, the far field antenna capacitively coupled to the tag 205 to transmit an encoded backscattered signal to the tag reader 106.

In one embodiment, the near field only RFID tag 205 may be pre-manufactured. According to several embodiments, the near field only RFID tag 205 does not function as a far field RFID tag, i.e., on its own, it can not be read in the far field by a tag reader 106. In preferred embodiments, the loop 202 is designed, shaped and/or configured to be suitable for use with a far field antenna capacitively coupled thereto. In some cases, the width or thickness of the conductors 208 and 210 is designed to ensure good capacitive coupling with the far field antenna. This is also in contrast to known pre-manufactured near field only RFID tags that are designed for use only in the near field. For example, the Impinj® Button™ is a near field only tag that has a chip with a circular loop. In some embodiments, the loop 202 is designed without a tag antenna 203 or far field antenna, but so that as described in more detail below, it will be later coupled to a separate tag antenna or a far field antenna in a separate manufacturing process. In some embodiments, the loop is designed in a generally rectangular shape with two elongated sides that correspond to the elongated conductors 208 and 210 to assist in generating a current traveling in the loop 202 via capacitive coupling with the far field antenna.

Figure 3A:
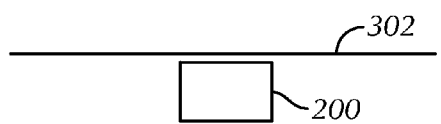
FIG. 3A is a diagram of a decoupled near field only RFID tag and a far field antenna located in proximity to provide a magnetic coupling therebetween such that the near field only RFID tag and the far field antenna function in both the near field and the far field in accordance with one embodiment.

Referring next to FIG. 3A, a simple diagram is shown of a decoupled near field only RFID tag 200 and a far field antenna 302 located in proximity. Due to the proximity of location, the near field only RFID tag 200 is magnetically coupled to the far field antenna 302 such that the combination of the near field only RFID tag 200 and the far field antenna 302 function as a far field RFID tag in accordance with one embodiment, e.g., the combination operates in both the near field and the far field. That is, when the far field antenna 302 is magnetically or inductively coupled to the near field only RFID tag 200, the device becomes visible to a far field RFID reader. In some embodiments, it is desired that the center of the far field antenna 302 should be aligned with a center of the near field loop 202. It is noted that the far field antenna 302 is one example of and may be generically referred to as a conductive element. In the illustrated embodiment, the far field antenna 302 takes the form of a simple metallic wire. That is, the far field antenna 302 is not printed or etched onto the substrate of the near field only tag 200. It is known that the magnetic coupling of a near field tag with a far field antenna results in a functioning near field and far field RFID tag; however, in contrast to prior attempts, the near field only RFID tag 200 and the far field antenna 302 are not integrated into an inlay or substrate package. As is further described below, several coupling structures are provided to locate the near field only RFID tag and the far field antenna in close proximity in order to be magnetically coupled. For example, in some embodiments, the near field only RFID tag and the far field antenna are coupled in proximity (or there is a proximity relationship defined therebetween), when a portion of the far field antenna 302 is contacting (electrically and magnetically coupled to) or spaced apart and near (magnetically or capacitively coupled to) a portion of the loop 202 of the near field only RFID tag.

In some embodiments, the near field only RFID tag 200 is mass produced without consideration of the dielectric properties of the item to be tagged, whereas the far field antenna is substantially tuned to the item to be tagged. This decouples the manufacturing of the near field only RFID tag 200 and the far field antenna 302. In one embodiment, since only the design (e.g., length) of the far field antenna 302 changes for different items, then the vendor can purchase bulk quantities of the near field RFID tag 200 for all items to be tagged, leading to economies of scale. Furthermore, relative to the known integrated near field RFID tag and far field antenna designs, since the far field antenna is not printed or etched as done in the prior art and depending on the wiring used, there may be less metal to be etched or printed for the RFID inlay, which leads to lower overall costs for the supplier to implement tagging. In some cases, when the far field antenna is integrated into the printing of the product label having a conductive material such as metal, there would be little additional cost in adding the far field antenna.

The far field antenna 302 may be implemented with a section of wire cut to a certain length. Thus, the vendor can purchase spools of wiring to be used as the far field antenna 302, cutting the proper length to be tuned for the frequencies in use and to also tune for the specific item to be tagged. It is noted that in the case of some items, while the far field antenna is tuned to the radio frequencies in use, additional tuning may not be necessary to account for the dielectric properties of the item. Thus, a particular length or configuration of the far field antenna may be selected based on the dimensions of the item and frequencies used without concern for the need to additionally tune the far field antenna to account for the dielectric properties of the item. In one embodiment, the wire is then placed where the center of the wires length is aligned with the center of the near field loop. Additionally, in some embodiments, the polarity of the far field antenna 302 and the near field only RFID tag 200 needs to be aligned. Furthermore, since they are not integrated in a substrate design, the design of the near field only RFID tag 200 does not need to account for the design of the far field antenna 302. It has been found that such a decoupled near field only RFID tag where the far field antenna 302 is tuned to the item performs as well or better than the conventional integrated near field tag and far field antenna approach.

The inlay supplier makes large production runs of a small near-field only tags gaining economy of scale cost reductions. The tag is much smaller using less metal providing a material cost reduction. In some embodiments, the manufacturer uses the same process to tag all items reducing execution cost. By way of example, the manufacturer inventories one near field only RFID tag 200 and a spool of wire (to be used for the conductive element that will function as the far field antenna) reducing the cost of production delays due to the correct tag being out of stock. The overall near and far field tag is tuned to the item so that it performs well through the many read points in the supply chain reducing the cost of inventory inaccuracies. Again, in some embodiments for use with some items, additional tuning to account for dielectric properties may not be needed.

For magnetic coupling between the near field RFID tag 200 and the far field antenna 302 so that both will function as a far field tag, in some embodiments, the near field RFID tag 200 and the far field antenna 302 need to be maintained at a close distance, but not electrically coupled together. For example, they are coupled in proximity to each other, or a proximity relationship is defined therebetween. In one embodiment, the near field only RFID tag 200 and the far field antenna 302 should be maintained at a separation distance of no more than ¼ inch, or no more than ⅛ inch, or in other cases, no more than 1/16 inch. In many embodiments, the separation distance will be much less than 1/16 inch. In some embodiments, an air gap is maintained between the near field only RFID tag and the far field antenna, whereas in other embodiments, an insulator or a non-electrically conducting material is located therebetween to prevent electrical coupling and/or aesthetic considerations. In other embodiments, the far field antenna 302 may be in physical or electrical connection with one or more of the near field only tag 200, the integrated circuit 204 of the near field tag or the loop 202. In such cases, the far field antenna 302 and the near field tag 200 will be electrically coupled and still be magnetically coupled. This is another example of the far field antenna 302 and near field only RFID tag being coupled in proximity to each other, or with a proximity relationship defined therebetween.

While in many embodiments, the far field antenna 302 is implemented as a simple wire, it is understood that the far field antenna may be any conductive element and may have many different geometries. For example, the far field antenna may be implemented as a flat and straight strip or elongated sheet of electrically conductive material. In some embodiments, the far field antenna may be printed onto a surface of the item or its packaging/label. In other embodiments, the far field antenna may be formed from a portion of the packaging of an item, such as a metallic or conductive lining of the packaging of the item. In other embodiments, the far field antenna may be formed from or implemented on the exterior label or printing on the item, such as conductive ink or a foil stamp formed on the item or a portion of the label for the item.

In further variations, the far field antenna is not required to be straight as illustrated, but may be shaped or bent or round into different shapes or configurations. However the far field antenna is designed, it should be adjustable to tune the far field antenna to the particular item that is to be tagged; however, some items will not require additional tuning to account for the dielectric properties of the item. By allowing only the far field antenna to be varied, in some embodiments, all RFID tags can be made using the same pre-manufactured near field only RFID tags.

Figure 3D:
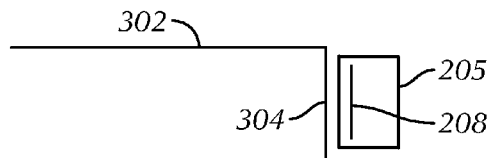
FIG. 3D is a diagram of a decoupled near field only RFID tag and a far field antenna located in proximity to provide a capacitive coupling therebetween such that the near field RFID tag and the far field antenna function in both the near field and the far field in accordance with one embodiment.
Figure 3B:
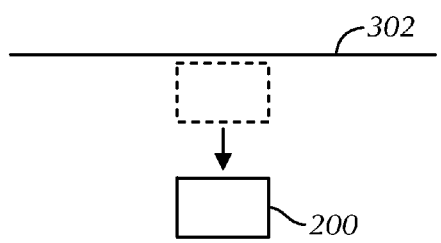
FIG. 3B is a diagram that illustrates the removing of the proximity relationship between the near field only RFID tag and the far field antenna such that the RFID device no longer functions as a far field RFID tag in accordance with one embodiment.

In further embodiments, a coupling structure/s is provided to locate the near field only RFID tag 200 and the far field antenna 302 for magnetic coupling (whether directly electrically contacting or not) and is designed to allow for the removal of the magnetic coupling, such as illustrated in FIG. 3B. That is, in a generic sense, a coupling structure is provided that will allow for the removal of the proximity relationship between the near field only RFID tag and the far field antenna. In other words, the far field antenna and the near field only RFID tag will be uncoupled in proximity. For example, a coupling structure (not illustrated) allows for the removal of one or both of the near field RFID tag 200 and the far field antenna 302 such that they are no longer magnetically (whether directly contacting or not) coupled together. This results in the conversion of the far field RFID tag back to a near field only RFID tag that can only be read in the near field, not the far field. That is, the RFID device no longer functions as a far field RFID tag. In some embodiments, the coupling structure may help maintain a separation between the near field only RFID tag 200 and the far field antenna 302.

Figure 3E:
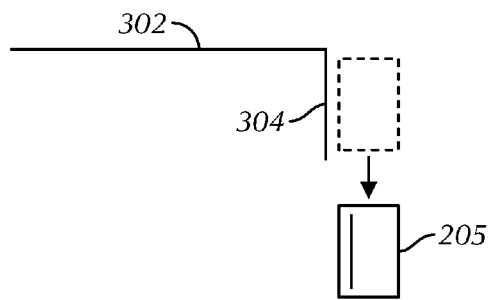
FIG. 3E is a diagram that illustrates the removing of the proximity relationship between the near field only RFID tag and the far field antenna such that the RFID device no longer functions as a far field RFID tag in accordance with one embodiment.
Figure 3C:
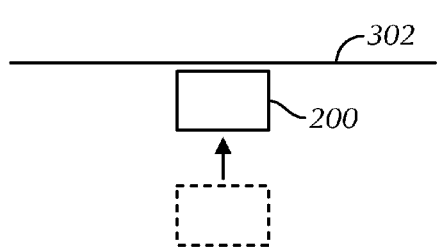
FIG. 3C is a diagram that illustrates the re-location of the near field only RFID tag and the far field antenna to be in proximity to each other to provide a magnetic coupling therebetween such that the near field only RFID tag and the far field antenna again function in both the near field and the far field in accordance with one embodiment.

In even further embodiments, as illustrated in FIG. 3C, the coupling structure (not illustrated) is designed to allow the re-location of the near field only RFID tag 200 and the far field antenna 302 to be in proximity to each other to provide a magnetic re-coupling therebetween such that the near field only RFID tag 200 and the far field antenna 302 again function both as a near field and a far field RFID tag in accordance with one embodiment. Thus, the proximity relationship between the far field antenna 302 and the near field only RFID tag 200 that was previously removed, can be re-established. For example, the coupling structure may be such that one or both of the near field only RFID tag 200 and the far field antenna 302 are able to be re-located such that both the near field only RFID tag and the far field antenna are again magnetically coupled together (whether electrically re-coupled or not). This results in the conversion of the near field only RFID tag back to a near and far field RFID tag. It is noted that in some embodiments, a replacement far field antenna and/or a replacement near field only RFID tag may be used instead of repositioning the same components. Example coupling structures include portions of the item itself or its packaging or label, insulating or non-electrically conducting separators, removable stickers or labels, etc. Further details of such coupling structures are described in more detail below.

It is noted that in some embodiments, other non-traditional designs may be used for the near field RFID tag. For example, in one alternative, chipless near field RFID tags are used instead of the traditional near field tags.

Figure 3F:
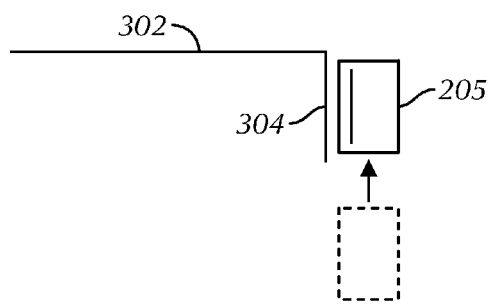
FIG. 3F is a diagram that illustrates the re-location of the near field only RFID tag and the far field antenna to be in proximity to each other to provide a capacitive coupling therebetween such that the near field only RFID tag and the far field antenna again function in both the near field and the far field in accordance with one embodiment.

Next referring to FIGS. 3D-3F, diagrams similar to those of FIGS. 3A-3C are shown that illustrate the removable coupling in proximity of a decoupled near field only RFID tag 205 such as shown in FIG. 2C and the far field antenna 302 with capacitive coupling therebetween in accordance with one embodiment. FIG. 3D illustrates the capacitive coupling, FIG. 3E illustrates the dynamically removal of the capacitive coupling and FIG. 3F illustrates the ability to re-establish the capacitive coupling.

Generally, the embodiments of FIGS. 3D-3F operate similarly, and have similar advantages and benefits as described in connection with FIGS. 3A-3C; however, the proximity coupling is in the form of capacitively coupling. Thus, much of the detailed description relating to FIGS. 3A-3C is not repeated and attention is given to the nature of the capacitive coupling.

To affect capacitive coupling, in one embodiment, the near field only RFID tag 205 is coupled in a spaced relationship to one end 304 of the far field antenna 302. In the illustrated embodiment, the end 304 is bent relative to the bulk of the far field antenna 302, although this is not required. In operation, the voltage at the end 304 oscillates due to the received electromagnetic energy from the tag reader 106. In some embodiments, the end 304 and the conductor 208 of the near field only RFID tag 205 form two electrodes of a capacitor. As the voltage oscillates at the end 304 building a charge, this creates an oscillating potential difference at the elongated side of the tag 205, which causes a current to flow about the loop of the near field only RFID tag 205. This flowing current allows the chip to operate and in turn, the far field antenna 302 capacitively coupled to the tag 205 to transmit an encoded backscattered signal to the tag reader 106.

To affect capacitive coupling, in one embodiment, the near field only RFID tag 205 is coupled in a spaced relationship to one end 304 of the far field antenna 302. In the illustrated embodiment, the end 304 is bent relative to the bulk of the far field antenna 302, although this is not required. In operation, the voltage at the end 304 oscillates due to the received electromagnetic energy from the tag reader 106. In some embodiments, the end 304 and the conductor 208 of the near field only RFID tag 205 form two electrodes of a capacitor. As the voltage oscillates at the end 304 building a [[at]] charge, this creates an oscillating potential difference at the elongated side of the tag 205, which causes a current to flow about the loop of the near field only RFID tag 205. This flowing current allows the chip to operate and in turn, the far field antenna 302 capacitively coupled to the tag 205 to transmit an encoded backscattered signal to the tag reader 106.

When the end 304 of the far field antenna 302 is capacitively coupled to the near field only RFID tag 205, the device becomes visible to a far field RFID reader. In some embodiments, it is desired that one end of the far field antenna 302 should be aligned with a conductor (adapted to form a capacitor electrode) of the near field only RFID tag 205. FIG. 3D provides another example of the near field only RFID tag and the far field antenna being coupled in proximity, or a proximity relationship being defined therebetween, when a portion of the far field antenna 302 is spaced apart and near (capacitively coupled to) a portion of the loop of the near field only RFID tag.

Figure 4B:
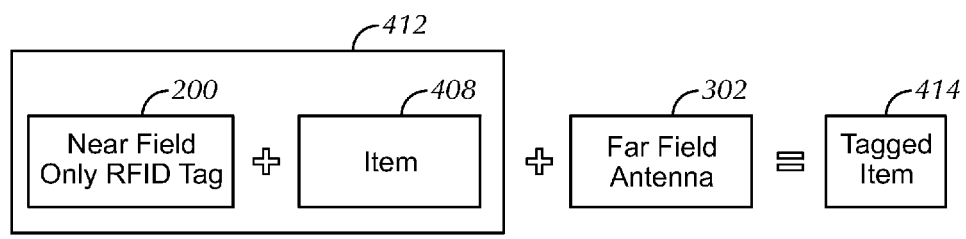
FIGS. 4B, 4C and 4D are illustrations of various manufacturing processes where the manufacturing of a near field only RFID tag and a far field antenna are decoupled in accordance with several embodiments.
Figure 4C:
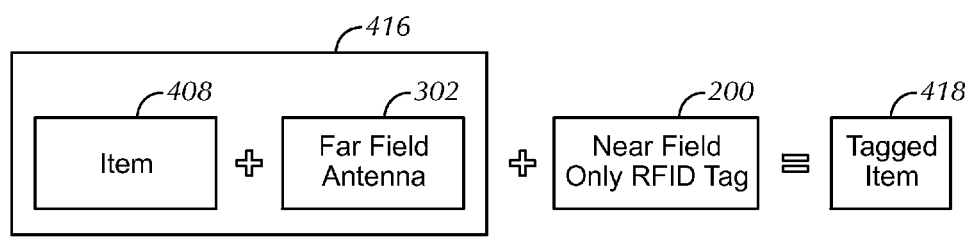
Figure 4D:
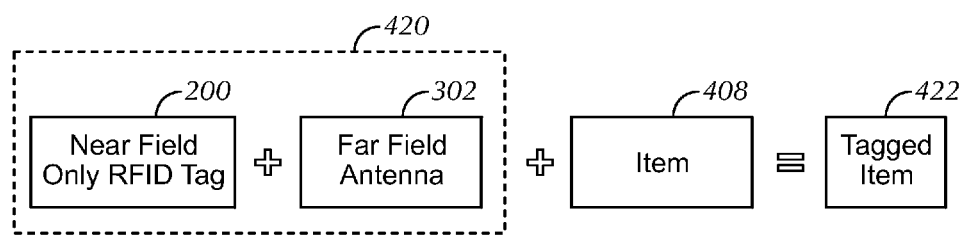

Referring next to FIGS. 4B, 4C and 4D, simplified representations of manufacturing processes are shown where the manufacturing of a near field only RFID tag and a far field antenna are decoupled in accordance with several embodiments.

Figure 4E:
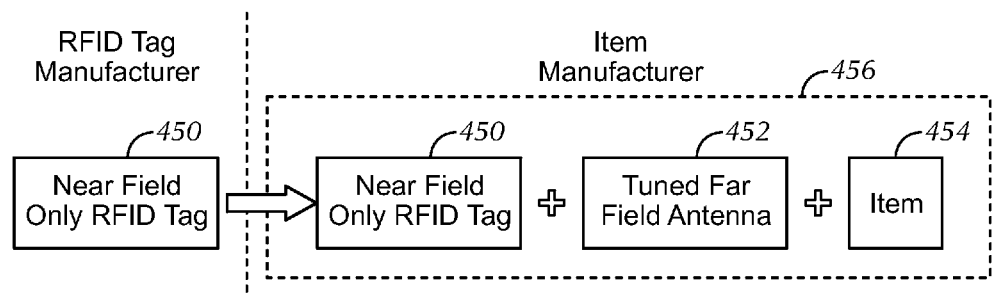
FIG. 4E is an illustration of a decoupled manufacturing process in accordance with several embodiments.

In contrast to that shown in FIG. 4A, and referring first to the embodiment of FIG. 4B, as a separate manufacturing process, the near field only RFID tag 200 (or 205) and the item 408 are coupled together without the far field antenna 302. For example, a standard pre-manufactured near field only RFID tag 200 is coupled to a surface of the item 408 at a desired location or desired surface of the item. In some cases, the near field only RFID tag 200 is implemented on interior surface of the item or its packaging. In other cases, the near field only RFID tag 200 is implemented within the item or its packaging, such as between material layers or between layers of corrugated cardboard packaging, by way of a few examples. It is understood that there may be many other examples. At this point, integrated unit 412 includes the item 408 and the near field only RFID tag 200. In one embodiment, the unit 412 will be designed to include a location or structure that will be adapted to receive the far field antenna 302. In one form, a mounting location is provided at a desired location proximate the near field only RFID tag 200 such that the near field only RFID tag 200 and the far field antenna 302 are coupled in proximity to each other, or a proximity relationship is established therebetween. As used herein, the term proximate refers to two components that very close or near to each other, and can cover a physical contact or connection between the two components. Next, as a separate manufacturing process, depending on the nature of the item 408, the far field antenna 302 that is tuned to the item 408 is added to the unit 412 to result in the tagged item 414. Typically, the far field antenna is designed and tuned to the item 408 prior to this step. For example, using the near field only tag and the far field antenna, through trial and error, the far field antenna can be tuned to the dielectric properties of the particular item. It is noted that in some embodiments, the far field antenna 302 does not need to be additionally tuned to account for the dielectric properties of the item, for example, if the item is simply a cardboard box. In some embodiments, the far field antenna 302 is applied as a sticker to an exterior surface of the unit 412 that is proximate to the near field only RFID tag 200 such that the far field antenna 302 will be aligned as intended with the near field only RFID tag 200 to ensure good proximity coupling (electric, magnetic or capacitive). In one embodiment, the coupling structure/s that couples the near field RFID tag 200 and the far field antenna 302 is designed so that one of the near field RFID tag 200 and the far field antenna 302, and the proximity relationship therebetween, are allowed to be removed from the tagged item 414, effecting the diagram of FIG. 3B or FIG. 3E. In some embodiments, the assembly of the tagged item 414 is done by the manufacturer and/or the packager of the item 408, such as shown in FIG. 4E.

FIG. 4C illustrates an alternative embodiment in which as a separate manufacturing process, the far field antenna 302 and the item 408 are coupled together without the near field only RFID tag 200 (or 205), where the far field antenna is already tuned to the item 408 (if tuning is needed for the item 408) in a prior manufacturing process. For example, the far field antenna 302 is coupled to a surface of the item 408 at a desired location or desired surface of the item. In some cases, the far field antenna 302 is implemented on interior surface of the item or its packaging. In other cases, the far field antenna 302 is implemented within the item or its packaging, such as between material layers or between layers of corrugated cardboard packaging, by way of a few examples. In some forms, the far field antenna 302 is implemented as part of or from a part of a conductive material forming part of the item or its packaging, such as a conductive ink or foil stamp. For example, in one embodiment, the far field antenna 302 is formed from a portion of a conductive label. It is understood that there may be many other examples. At this point, integrated unit 416 includes the item 408 and the far field antenna 302 but not the near field only RFID tag 200. In one embodiment, the unit 416 will be designed to include a location or other coupling structure that will be adapted to receive the near field only RFID tag 200. In one form, a mounting location is provided at a desired location proximate to the far field antenna 302 such that the near field only RFID tag 200 and the far field antenna 302 will be coupled in proximity to each other, or a proximity relationship will be established therebetween. Next, as a separate manufacturing process, the near field only RFID tag 200 is added or affixed to the unit 416 to result in the tagged item 418. In some embodiments, the near field only RFID tag 200 is applied as a sticker to an exterior surface of the unit 416 that is proximate to the far field antenna 302 such that the near field RFID tag 200 will be aligned as intended with the far field antenna 302 to ensure good proximity coupling (electric, magnetic or capacitive). In one embodiment, the coupling structure/s that couple the near field only RFID tag 200 and the far field antenna 302 is designed so that one of the near field only RFID tag 200 and the far field antenna 302, and the proximity relationship therebetween, are allowed to be removed from the tagged item 418, effecting the diagram of FIG. 3B or FIG. 3E. In some embodiments, the assembly of the tagged item 418 is done by the manufacturer and/or the packager of the item 408, such as shown in FIG. 4E.

FIG. 4D illustrates a further manufacturing process in which while the near field only RFID tag 200 (or 205) and the far field antenna 302 are separately and independently designed, they are packaged together as unit 420 prior to being coupled in proximity to the item 408. However, in contrast to that shown in FIG. 4A, the near field only RFID tag 200 and the far field antenna 302 are independently designed and not integrated in the same manufacturing process and/or on the same substrate. In several embodiments, a coupling structure is provided to maintain the near field only RFID tag 200 and the far field antenna 302 in close proximity to ensure magnetic or capacitive coupling without electrical coupling, whereas in other embodiments, the near field only RFID tag 200 and the far field antenna 302 are in electrical connection and magnetically coupled. Such coupling structure does not integrate the near field only RFID tag 200 and the far field antenna 302 such that the design of one at least in part does not dictate the design of the other as is the case with all known prior attempts to integrate a near field RFID tag and far field antenna into a near and far field tag on a substrate. For example, in one embodiment, the pre-manufactured near field only RFID tag 200 is applied to an under surface of a sticker or other coupling structure, then the far field antenna 302 predesigned to be tuned to the item 408 (to the extent additional dielectric tuning is needed) is also applied to the under surface (or top or other surface) of the sticker. This combination unit 420 including a coupling structure, the near field only RFID tag 200 and the far field antenna 302 and is then applied to the item 408 to result in the tagged item 422. In one embodiment, the unit 420 is designed so that one of the near field only RFID tag 200 and the far field antenna 302, and the proximity relationship therebetween, are allowed to be removed from the unit 420, effecting the diagram of FIG. 3B or FIG. 3F. In some embodiments, the assembly of the tagged item 418 is done by the manufacturer and/or the packager of the item 408, such as shown in FIG. 4E.

It is noted that by allowing for the independent design and manufacture of the near field RFID tag and the far field antenna, the design of each can be optimized without concern for the other, at least with respect to design to account for the dielectric properties of the item to be tagged. In some embodiments, the near field only RFID tag is at least designed so that the near field loop of the near field only RFID tag can efficiently couple to the far field antenna. This allows a best of both worlds device, as opposed to conventional approaches that integrate a near tag and a far field antenna into one substrate package such that the device of both components can result in a compromise due to the level of integration.

It is further noted that the item 408 to be tagged may generally be any living or non-living object, package, material, structure, animal, plant, person, etc. In a commercial manufacturing, distribution, retail environment, the item 408 may be a portion of or a whole of a product, object, label, product label, product packaging, carton, container, pallet, etc. It is understand that these example lists of potential items to be tagged is provided by way of example and is not an exhaustive list of all items that could be tagged in accordance with one or more embodiments. In accordance with several embodiments, the item 408 to be tagged is an individual item, or the packaging for an individual item, to be presented for sale in a commercial setting.

Referring next to FIG. 4E, an illustration is shown of a decoupled manufacturing process in accordance with several embodiments. Initially, a near field only RFID tag 450 (e.g., near field only RFID tags 200, 205) is obtained from an RFID tag manufacturer. The near field only RFID tag 450 is mass produced and item neutral. That is, the near field only RFID tag 450 has not been designed to account for the dielectric properties of any particular item to be tagged. Like those described above, the near field only RFID tag 450 does not include a tag or far field antenna, and thus; is only readable in the near field of the operating reader wavelengths. Since the near field only RFID tag 450 does not have to be tuned or otherwise account for a particular item, the cost of the near field only RFID tag 450 can be minimized. For example, there is less metal used in the near field only RFID tag 450. Additionally, the RFID tag manufacturer need only manufacture, and the item manufacturer need only obtain, one version of the near field only RFID tag 450 produced in mass for all items to be tagged.

The item manufacturer obtains the near field only RFID tag 450 and uses it together with a far field antenna 452 (generically, a conductive element) tuned for the particular item 454 to be tagged (to the extent tuning is needed) to produce a tagged item 456. Since the far field antenna 452 is designed by the item manufacturer, and may often be implemented as part of the packaging design, the cost of the overall RFID tag can be reduced and item-level tagging in a commercial retail environment is achievable. By tuning the far field antenna 452 to the item, the item manufacturer is able to create tagged items that will be within acceptable read requirements required by retailers or customers of manufacturer vendors. It has been found that there is great variability in the performance of RFID tags when implemented on final items that RFID tag manufacturers are not in the best position to understand. Thus, in some embodiments, the location of the tuning function is provided to the entity that is in the best position to understand and know the final intended use of the tag. Additionally, as illustrated in FIGS. 5-16, the design of the far field antenna 452 may be developed together with the item or its packaging. Several embodiments of the decoupling of the manufacturing and design of the near field RFID tag functionality and the far field antenna functionality are accomplished in a way that can lead to efficiencies in manufacturing costs and improvements in read rates.

Figure 5:
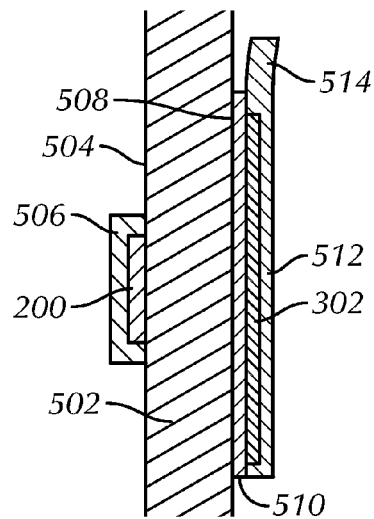
FIG. 5 is a cross sectional view of one implementation of a decoupled near field only RFID tag and far field antenna as affixed to an item in accordance with one embodiment.

Referring next to FIG. 5, a cross sectional view is shown of one implementation of a decoupled near field only RFID tag 200 and far field antenna 302 as affixed to a portion 502 of an item in accordance with one embodiment. Alternatively, near field only RFID tag 205, 450 or other near field only RFID tag could be used. The portion 502 of the item may be the item itself or the packaging of the item. In the illustration, the near field only RFID tag 200 is coupled to an interior surface 504 of the portion 502 with coupler 506, which may be embodied as a sticker or other structure. The far field antenna 302 is illustrated as being coupled to the exterior surface 508 of the portion 502 of the item. In one embodiment, the far field antenna 302 is coupled to the portion 502 with couplers 510, 512. It is noted that in some embodiments, one or more of the couplers 506, 510 and 512 should be insulating to prevent electrical coupling of the far field antenna and the near field only RFID tag. Other embodiments may allow the far field antenna 302 and the near field only RFID tag 200 to be electrically connected and magnetically coupled. In one embodiment, the couplers 510, 512 take the form of a sticker. Thus, a coupling structure is provided to couple the far field antenna 302 and the near field RFID tag 200 to the item in close proximity to ensure magnetic coupling therebetween (or capacitive coupling in the case of the near field only RFID tag 205). In alternative embodiments, the coupling structure provides an air gap separation between the far field antenna 302 and the near field only RFID tag 200. The portion 502 is selected to have a thickness to allow the close coupling, e.g., less than about ¼ inch, less than about ⅛ inch, or less than about 1/16 inch. Alternatively, in one embodiment, one or both of the couplers 510 and 512 are not needed and the far field antenna 302 is applied or printed directed to the surface 508. In this case, the surface 508 and the portion 502 become the coupling structure to maintain the far field antenna and the near field only RFID tag in close proximity for electrical, magnetic and/or capacitive coupling. In the illustrated embodiment, the coupler 512 is removable from the coupler 510 to allow the far field antenna 302 to be later removed depending on the use of the RFID tag. For example, a user could pull a tab 514 to remove the coupler 512 and the far field antenna 302 from the coupler 510 and the portion 502. Removal of the coupler 512 results in the far field antenna being magnetically decoupled from the near field only RFID tag such that the remaining RFID tagged item will only function as a near field tag. That is, the proximity relationship between the far field antenna and the near field only RFID tag is removed. It is noted that the coupler 510 may not be present or may be a layer of adhesive in other embodiments. In another alternative, the coupler 512 may simply take the form of an outer packaging wrap, such as a plastic or paper (preferably an insulating material) wrap having the far field antenna attached thereto, but removable when the plastic wrap is removed.

Figure 6:
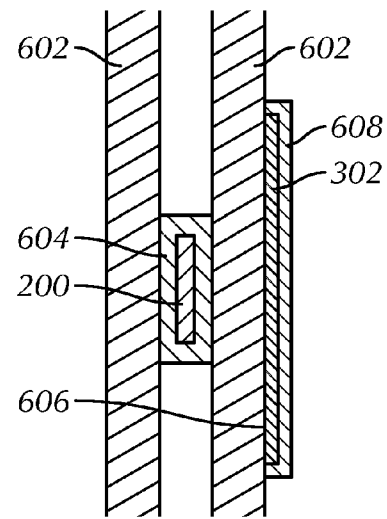
FIG. 6 is a cross sectional view of another implementation of a decoupled near field only RFID tag and far field antenna as affixed to an item in accordance with one embodiment.

Referring next to FIG. 6, a cross sectional view is shown of another implementation of a decoupled near field only RFID tag 200 and far field antenna 302 as affixed to a portion 602 of an item in accordance with one embodiment. In another embodiment, near field only RFID tag 205, 450 or other near field only RFID tag could be used. The portion 602 of the item may be a portion of the item itself or the packaging of the item. In the illustration, the near field only RFID tag 200 is embedded within layers of the portion 602, e.g., between layers of a corrugated cardboard structure, with coupler 604, which may be embodied as a sticker or other insulating structure. The far field antenna 302 is illustrated as being coupled directly to the exterior surface 606 of the portion 602 of the item with coupler 608. In one embodiment, the coupler 608 takes the form of a sticker. Thus, in some embodiments, a coupling structure is provided to couple the far field antenna 302 and the near field only RFID tag 200 to the portion 602 of the item in close proximity to ensure magnetic coupling therebetween without electrical coupling (or capacitive coupling in the case of the near field only RFID tag 205). The portion 602 is selected to have a thickness to allow the close coupling needed for magnetic or inductive coupling, e.g., less than about ¼ inch, less than about ⅛ inch, or less than about 1/16 inch. Again, in some embodiments, the far field antenna 302 and the near field only RFID tag 200 are electrically and magnetically coupled. In alternative embodiments, the coupling structure provides an air gap separation between the far field antenna 302 and the near field only RFID tag 200. Alternatively, in one embodiment, the far field antenna 302 is adhered or printed to the exterior surface 606 such that the coupler 608 is not needed. In this case, the exterior surface 606 and the portion 602 become the coupling structure to maintain the far field antenna and the near field only RFID tag in close proximity for electrical, magnetic and/or capacitive coupling. Although not specifically illustrated, in some embodiments, the coupler 608 and the far field antenna 302 may be adapted to be removed from the portion 602 to allow the far field antenna 302 to be later removed depending on the use of the RFID tag. For example, a user could pull on a tab to remove the coupler 609 and the far field antenna 302. This removal will result in the far field antenna being magnetically decoupled from the near field only RFID tag such that the remaining RFID tagged item will only function as a near field tag and no longer function as a far field tag. That is, the proximity relationship (whether electrical, magnetic and/or capacitive) between the far field antenna and the near field only RFID tag is removed. In one alternative, the coupler 608 may simply take the form of an outer packaging wrap, such as a plastic wrap, shrink wrap or paper wrap having the far field antenna attached thereto, but removable when the wrap is removed.

Figure 7:
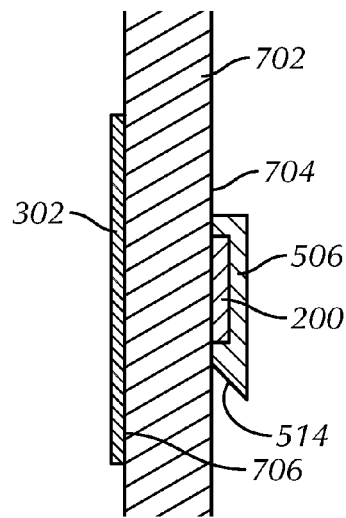
FIG. 7 is a cross sectional view of a further implementation of a decoupled near field only RFID tag and far field antenna as affixed to an item in accordance with one embodiment.

FIG. 7 is a cross sectional view of a further implementation of a decoupled near field only RFID tag 200 and far field antenna 302 as affixed to a portion 702 of an item in accordance with one embodiment. In another embodiment, near field only RFID tag 205, 450 or other near field only RFID tag could be used. The portion 702 of the item may be a portion of the item itself or the packaging of the item. In the illustration, the near field only RFID tag 200 is coupled to an exterior surface 704 of the portion 702 with the coupler 506, which may be embodied as a sticker or other structure. The far field antenna 302 is illustrated as being coupled to the interior surface 706 of the portion 702 of the item, e.g., it is printed or formed or otherwise adhered to the interior surface 706. In an alternative embodiment, the far field antenna 302 is coupled to the interior surface 706 with a coupler, such as a sticker or other structure. Thus, in some embodiments, a coupling structure is provided to couple the far field antenna 302 and the near field only RFID tag 200 to the item in close proximity to ensure magnetic coupling therebetween (or capacitive coupling in the case of the near field only RFID tag 205). The portion 702 is selected to have a thickness to allow the close coupling, e.g., less than about ¼ inch, less than about ⅛ inch, or less than about 1/16 inch. Again, in some embodiments, the far field antenna 302 and the near field only RFID tag 200 are electrically and magnetically coupled. In alternative embodiments, the coupling structure provides an air gap separation between the far field antenna 302 and the near field only RFID tag 200. In the illustrated embodiment, the coupler 506 is removable from the exterior surface 704 to allow the near field only RFID tag 200 to be later removed depending on the use of the RFID tag. For example, a user could pull on the tab 514 to remove the coupler 506 and the near field only RFID tag 200. Removal of the coupler 506 and near field RFID tag 200 results in the far field antenna being magnetically decoupled from the near field only RFID tag such that the far field RFID tagging of the item is now disabled. That is, the proximity relationship (whether electrical, magnetic and/or capacitive depending on the tag) between the far field antenna and the near field only RFID tag is removed. It is noted that the same or a different near field only RFID tag and coupler 506 could be positioned in place on the exterior surface 704 (i.e., the proximity relationship is re-established) and then the item would be tagged with a tag operational and readable in both the near field and the far field. It is noted that the coupler 506 may not be present in some embodiments, and that the near field only RFID tag is attached with adhesive or other coupling structure to the exterior surface 704. In another alternative, the coupler 506 may simply take the form of an outer packaging wrap, such as a plastic wrap having the near field only RFID tag attached thereto, but removable when the plastic wrap is removed.

Figure 8:
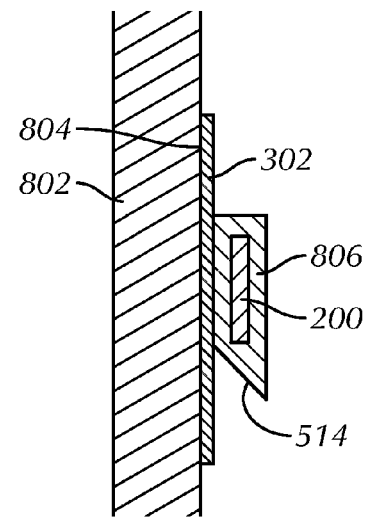
FIG. 8 is a cross sectional view of another implementation of a decoupled near field only RFID tag and far field antenna as affixed to an item in accordance with one embodiment.

Referring next to FIG. 8, a cross sectional view is shown of another implementation of a decoupled near field only RFID tag 200 and far field antenna 302 as affixed to a portion 802 of an item in accordance with one embodiment. In another embodiment, near field only RFID tag 205, 450 or other near field only RFID tag could be used. The portion 802 of the item may be a portion of the item itself or the packaging of the item. In the illustration, the far field antenna 302 is coupled to an exterior surface 804 of the portion 802, e.g., it is adhered, printed, or otherwise attached. The near field only RFID tag 200 is illustrated as being coupled in proximity to the far field antenna 302 via coupler 806, which at least forms an electrical insulator or barrier between the far field antenna 302 and the near field only RFID tag 200 to prevent electrical contact. In the illustrated embodiment, the coupler 806 completely surrounds the near field only RFID tag 200. In an alternative embodiment, a sticker completely covers the far field antenna 302 and the near field only RFID tag 200. For example, the far field antenna and the near field only RFID tag are formed or positioned on the under side of a sticker. Thus, in some embodiments, a coupling structure (surface 804 and coupler 806) is provided to couple the far field antenna 302 and the near field only RFID tag 200 to the item in close proximity to ensure magnetic coupling therebetween (or capacitive coupling in the case of the near field only RFID tag 205). In preferred form, the portion of the coupler 806 that separates the far field antenna from the near field only RFID tag is selected to have a thickness sufficient to allow the close coupling, e.g., less than about ¼ inch, less than about ⅛ inch, or less than about 1/16 inch. Again, in some embodiments, the far field antenna 302 and the near field only RFID tag 200 are electrically and magnetically coupled, whereas in other embodiments they are capacitively coupled together. In one alternative, such as illustrated in FIG. 9, an air gap 902 is maintained between the near field only RFID tag 200 and the far field antenna 302 to prevent electrical coupling rather than using an insulating or electrically non-conducting material, such as coupler 806. In the illustrated embodiment, the coupler 806 is adapted to be removable from the exterior surface of the far field antenna 302 depending on the use of the RFID tag. For example, a user could pull on the tab 514 to remove the coupler 806 and the near field only RFID tag 200. Removal of the coupler 806 and near field only RFID tag 200 results in the far field antenna being magnetically decoupled from the near field RFID tag such that the far field RFID tagging of the item is now disabled. That is, the proximity relationship (whether electrical, magnetic and/or capacitive depending on the tag) between the far field antenna and the near field only RFID tag is removed. It is noted that the same or a different near field only RFID tag and coupler 806 could be positioned in place on the exterior surface 804 (i.e., the proximity relationship is re-established) and then the item would be tagged with a tag operational and readable in both the near field and the far field. In an alternative, the coupler 806 may simply take the form of an outer packaging wrap, such as a plastic or paper wrap having the near field only RFID tag attached thereto, but removable when the wrap is removed.

Referring next to FIG. 14, a cross sectional view is shown of another implementation of a decoupled near field only RFID tag 200 and far field antenna 302 as affixed to portion 802 of an item in accordance with one embodiment. This embodiment is similar to the embodiment of FIG. 8 and its variations, except that the coupler 1406 allows for the near field only RFID tag 200 to electrically contact the far field antenna 302. Thus, the far field antenna 302 is electrically and magnetically coupled to the near field only RFID tag. In other words, the far field antenna 302 is coupled in proximity to the near field only RFID tag. Similar to coupler 806, coupler 1406 is adapted to be removable from the exterior surface of the far field antenna 302. For example, a user could pull on the tab 514 to remove the coupler 1406 and the near field only RFID tag 200. Removal of the coupler 1406 and near field only RFID tag 200 results in the far field antenna being electrically and magnetically decoupled from the near field only RFID tag such that the far field RFID tagging of the item is now disabled. That is, the proximity relationship (electrical and magnetic) between the far field antenna and the near field only RFID tag 200 is removed. It is noted that the same or a different near field only RFID tag and coupler 1406 could be positioned in place on the exterior surface 804 (i.e., the proximity relationship is re-established) and then the item would be tagged with a tag operational and readable in both the near field and the far field. In an alternative, the coupler 1406 may simply take the form of an outer packaging wrap, such as a plastic or paper wrap having the near field only RFID tag attached thereto, but removable when the wrap is removed.

Accordingly, several examples are provided for various coupling configurations to locate the near field only RFID tag and the far field antenna such that they are coupled in proximity, or have a proximity relationship therebetween. For example, in some cases, the near field only RFID tag and the far field antenna are coupled in proximity to ensure magnetic coupling but not electrical contact. In other embodiments, the various coupling configurations can locate the far field antenna such that it is in electrical connection with one or more of the near field only RFID tag, the loop and the integrated circuit of the near field only RFID tag so that the near field only RFID tag is electrically and magnetically coupled to the far field antenna. In other embodiments, the various coupling configurations can locate the far field antenna such that it is capacitively coupled with the near field only RFID tag. Examples of coupling structures include, but are not limited to, removable materials, stickers, labels, portions of the item or its packaging, other holding structures to hold the near field only RFID tag and the far field antenna in a fixed arrangement but with an air gap or insulator separation therebetween or electrical connection therebetween, to name a few. Furthermore, the coupling structures may include more than one physical component. Coupling structures may also be insulating or non-electrically conducting materials. Additionally, the coupling structures may be configured such that one or both of the near field RFID tag and the far field antenna can be removed from close proximity or electrical connection to the each other, i.e., the proximity relationship is removed. This is in contrast to known integrated RFID tags where the near field tag and the far field antenna are non-separably integrated into a single integrated unit.

Referring next to FIG. 10, an illustration is shown of a portion of an item packaging in which a far field antenna 302 is formed on a surface of the item packaging and separate from the manufacturing of the near field only RFID tag (such as tags 200, 205 or 450) in accordance with one embodiment. In this embodiment, one surface (e.g., an inner surface) of the item to be tagged has a thin metal layer 1002 or film (such as may be found in the material forming a bag of potato chips). The metal layer 1002 is deposited or printed on the plastic sheet of the item. In accordance with one embodiment, the far field antenna 302 is etched or printed into the metal layer. In a further embodiment, the thin metal layer 1002 may be printed as a conductive printable ink or foil stamp. For example, as illustrated, the metal layer 1002 is applied everywhere except about a periphery 1004 to form the far field antenna 302. The result is that the elongated conductive strip formed within the periphery 1004 is used as the far field antenna. Prior testing indicates the proper dimensions of the far field antenna in order that it be tuned to the item being tagged (if additional dielectric tuning is needed) so that the RFID tag will work properly. At this point, a pre-manufactured near field only RFID tag can be located on the opposite or exterior side of the item in a location at a central portion of the far field antenna 302 and to ensure proximity coupling (electrical and/or magnetic or capacitive coupling). In other cases, the near field only RFID tag can be located on top of the far field antenna 302 at a central portion to ensure proximity coupling, e.g., using a coupling structure such as a sticker, adhesive, etc. In this way, the far field antenna and the near field only RFID tag function in both the near field and the far field.

Referring next to FIG. 15, an illustration is shown of a portion of an item packaging in which the far field antenna 302 is formed on a surface of the item packaging in accordance with a variation of the embodiment of FIG. 10. This embodiment is similar to FIG. 10 except that the far field antenna 302 is formed with the thin metal layer surrounding the periphery 1004. Electrons are caused to move about the periphery 1004 which causes a difference in potential voltage across between the two elongated lengths of the periphery 1004. This is used to cause current to occur in the loop of a near field only RFID tag. A pre-manufactured near field only RFID tag can be removably or non-removably coupled in proximity (electrical and/or magnetic or capacitive coupling) to the far field antenna 302. In this way, the far field antenna and the near field only RFID tag function in both the near field and the far field. The embodiment of FIG. 16 illustrates the proximity coupling of the near field only RFID tag 205 ensuring a capacitive coupling between the tag 205 and the far field antenna.

It is noted that FIGS. 5-10 and 14-16 illustrate several different features of several embodiments, and that it is understood that while not all combinations of features are described, one of skill in the art can incorporate or combine one or more features from one of more of the embodiments of FIGS. 5-10 and 14-16 to create a device in accordance with one or more embodiments of the invention.

Many of the embodiments described herein provide the decoupling of the manufacturing of the near field only RFID tag and the far field antenna in an RFID device. In many cases, this results in a dramatic reduction in costs a supplier must bear to ensure item level tagging while meeting tag certifications. For example, by using a design in which all tags can use the same basic near field only RFID tag, such near field only RFID tags 200 and 205, regardless of the item being tagged, the supplier can achieve great economies of scale since such pre-manufactured near field tags can be ordered in bulk. Furthermore, the supplier will have lower costs in designing the far field antennas in many cases if simple conductive wiring is used or if integrated with label or packaging design. Accordingly, it is believed that this reduction is cost should make it much more cost effective and feasible to implement item level tagging.

Figure 11:
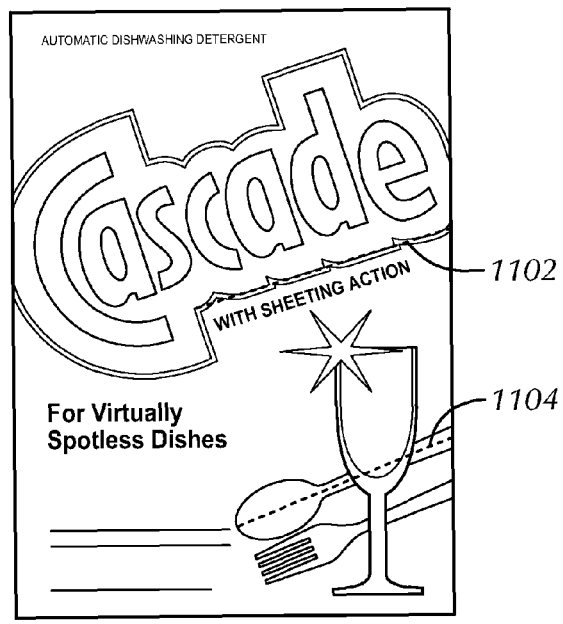
FIGS. 11-13 are illustrations of example items to incorporate RFID tagging devices wherein the far field antenna design is incorporated into the product label design in accordance with several embodiments.
Figure 12:
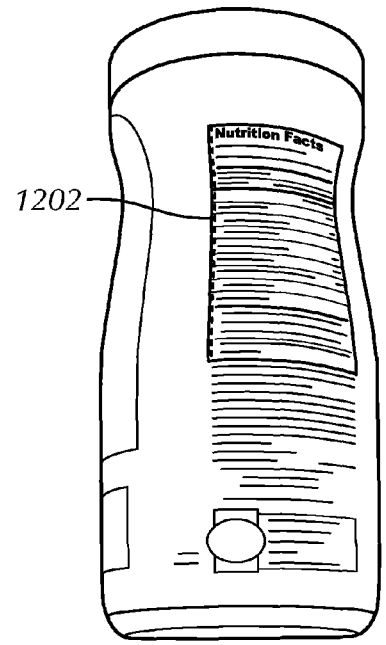
Figure 13:
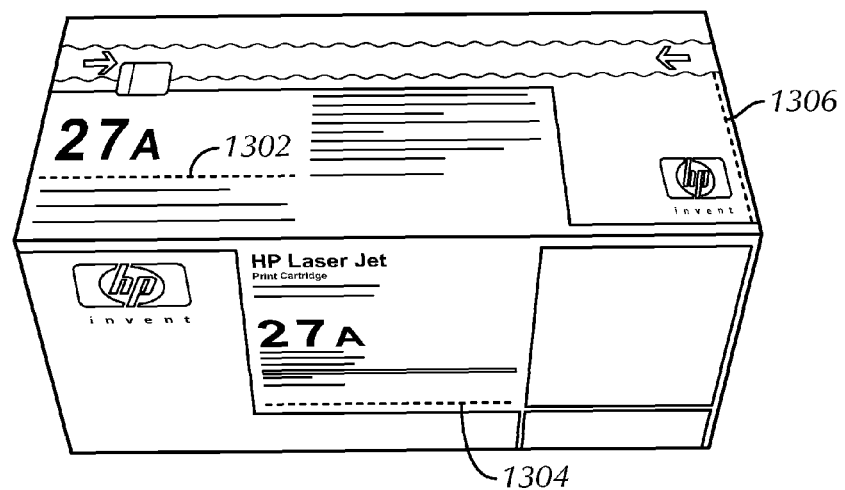

Next, referring to FIGS. 11-13, illustrations are shown of example items to incorporate RFID tagging devices wherein the far field antenna design is incorporated into the product label design in accordance with several embodiments. In the illustration of FIG. 11, the material used to make the labeling of the package includes a metallic component which may be used to incorporate the far field antenna. For example, the label in this case includes a metal or conductive material. Alternatively, the label could include a printable conductive ink or a foil stamp or other thin metallic or conductive layer. Locations 1102 and 1104 provide example locations where a far field antenna may be implemented. Both locations 1102 and 1104 are generally linear and suitable to form the far field antenna. It is understood that the far field antenna is not required to be a straight linear structure in all embodiments, but is shown so here for simplicity. That is, it is understood that the far field antenna may be implemented in other non-linear arrangements or linear arrangements that change directions or bend around aspects of the label. Should location 1102 or 1104 be implemented as a far field antenna, the near field only RFID tag could be located on top of a central portion of the location or underneath a central portion of the location to provide magnetic coupling. Alternatively, the near field only RFID tag could be located on top of an end portion of the location or underneath an end portion of the location to provide efficient capacitive coupling. In FIG. 12, location 1202 is the left vertical edge of the Nutritional Facts product label printed on the item, which is a plastic bottle. The edge of the Nutritional Facts label could be printed with a conductive ink or a foil stamp at location 1202 (or about its entire periphery) and the near field only RFID tag could be located on top of the location 1202 or underneath it (inside the bottle) using a sticker or other adhesive material, for example. In a further example, FIG. 13 illustrates a cardboard box package and includes example linear locations 1302, 1304 and 1306 as possible locations to implement a far field antenna in the labeling of the item. Again, the far field antenna may be printed with conductive ink or have a foil stamp applied thereto during design and manufacture of the labeling/cardboard box. These locations are certainly not the only locations to implement a far field antenna, and are provided by way of example. This is important for some embodiments in that it allows the item manufacturer to design the far field antenna together with the product or label design (such as described in some embodiments of FIG. 4C) and allow use of standard, low cost pre-manufactured near field only RFID tags. This provides added flexibility and new efficiencies for suppliers to provide cost effective item level tagging.

Figure 17:
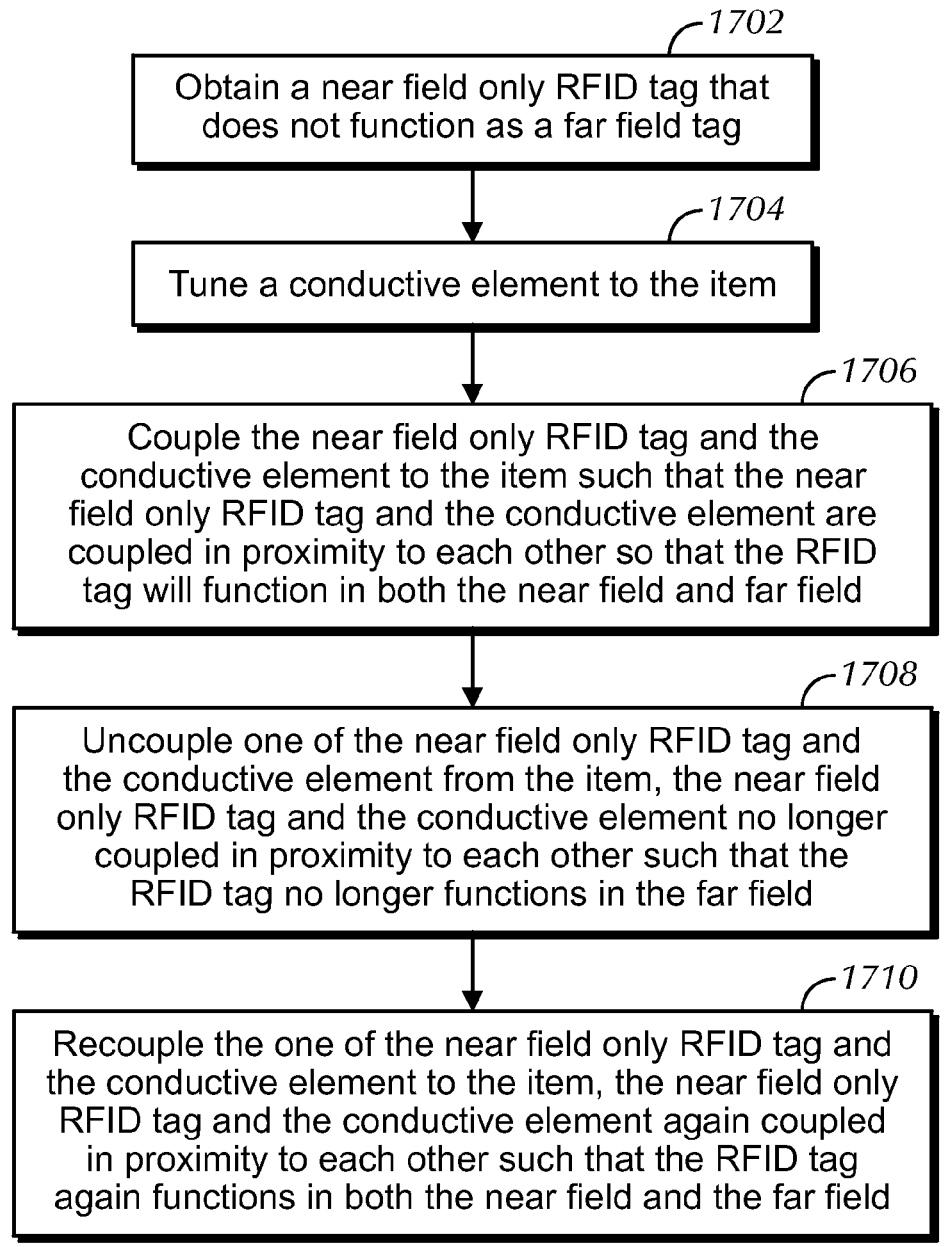
FIG. 17 is a flowchart of the steps performed in one or more manufacturing methods in accordance with several embodiments.

Referring next to FIG. 17, a flowchart is shown of the steps performed in one or more manufacturing methods in accordance with several embodiments. Embodiments of the methods of FIG. 17 may be used to manufacture one or more of the RFID tag devices and other RFID tag devices as described herein.

Initially, a near field only RFID tag that does not function as a far field tag is obtained (Step 1702). In some embodiments, the near field only RFID 200, 205 and/or 450 may be used. In several embodiments, the near field only RFID tag includes an integrated circuit or chip and a near field loop, but does not include a tag antenna or far field antenna. In one embodiment, the near field only RFID tag is obtained by removing the far field antenna from a commercially available integrated near and far field RFID tag. In another embodiment, such as described in FIG. 4E, for example, the near field only RFID tag is manufactured in mass by an RFID tag manufacturer. In some embodiments, the near field only RFID tag is not designed to account for the dielectric properties of any particular item to be tagged.

Next, a conductive element is tuned to an item to be tagged, where the conductive element is adapted to function as a far field antenna (Step 1704). In some embodiments, this is done in a separate manufacturing process, for example, by an item or packaging manufacturer or packager, such as described in connection with FIG. 4E. This tuning accounts for the particular dielectric properties of the item to be tagged, or product attached to the item (product label) actually tagged. When referring to the tuning of the conductive element, generally, one purpose of the RFID tag device is to provide an impedance matching structure to couple electromagnetic energy (e.g., radio frequency) in free space to an integrated circuit containing the integrated circuit or chip. The dielectric properties of the item to be tagged can alter the impedance match of the RFID tag device such that the conductive element (e.g., far field antenna) may become de-tuned. This can result in read errors. Thus, tuning can be referred to as impedance matching. An effect of being substantially tuned is that the RFID device will perform substantially efficiently as a far field device. By designing the conductive element (for example, designing its dimensions), the conductive element can be tuned to a particular item. In some embodiments, this tuning is done by trimming the length of the conductive element while being influenced by the dielectric of the target item (or otherwise printing various dimensioned conductive elements) until an optimal impedance match is found. In one embodiment, through testing, different dimensions of the conductive element are used and an optimal tuned dimension results when the performance of the RFID tag sensitivity and backscatter strength on either side of the dimension drops. In several embodiments, advantageously, the near field only RFID tag is not required to be tuned and thus, can be cost effectively mass produced, whereas the conductive element is tuned to the item in a separate manufacturing process. In some embodiments, this step is optional if tuning is not required for a particular item to be tagged.

Next, the near field only RFID tag and the conductive element are coupled to the item such that the near field only RFID tag and the conductive element are coupled in proximity to each other so that the RFID tag will function in both the near field and far field (Step 1706). This may be done in any variety of ways and implemented by a variety of coupling structures, couplers and/or surfaces, such as described and illustrated herein. For example, in one embodiment, the conductive element is formed from a printable conductive ink that is printed to a surface of the item (or its packaging). In another embodiment, the conductive element is formed or applied using a foil stamp to a surface of the item (or its packaging). Additionally, in one embodiment, the conductive element is located relative to the near field RFID tag such that the conductive element is magnetically coupled to the near field only RFID tag. In another embodiment, the conductive element is located relative to the near field RFID tag such that the conductive element is capacitively coupled to the near field only RFID tag. In a further embodiment, the conductive element is located relative to the near field RFID tag such that the conductive element is electrically contacting the near field only RFID tag.

Next, in accordance with some embodiments, one of the near field only RFID tag and the conductive element are decoupled from the item, the near field only RFID tag and the conductive element no longer coupled in proximity to each other such that the RFID tag no longer functions or is readable in the far field (Step 1708). In some embodiments, this is illustrated in simplified form in FIGS. 3B and 3E. This may be done in any variety of ways and implemented by a variety of coupling structures, couplers and/or surfaces, such as described and illustrated herein.

Next, in accordance with some embodiments, the one of the near field only RFID tag and the conductive element (or a replacement or different one of the near field only RFID tag and the conductive element) is recoupled to the item, the near field only RFID tag and the conductive element again coupled in proximity to each other such that the RFID tag again functions in both the near field and the far field (Step 1710). In some embodiments, this is illustrated in simplified form in FIGS. 3C and 3F. This may be done in any variety of ways and implemented by a variety of coupling structures, couplers and/or surfaces, such as described and illustrated herein.

Accordingly, as exemplified by the examples described herein, several radio frequency identification (RFID) devices are provided. In one embodiment, a radio frequency identification (RFID) device comprises an item having a first location and a second location, and one of a near field only RFID tag and a conductive element coupled to the first location of the item, wherein the near field only RFID tag does not function as a far field RFID tag, wherein the conductive element is adapted to function as a far field antenna. The second location of the item is adapted to receive and allow to be coupled thereto the other of the near field only RFID tag and the conductive element, the second location located relative to the first location such that when the other of the near field only RFID tag and the conductive element is coupled thereto, the conductive element will be coupled in proximity to the near field only RFID tag such that the RFID device will function in both a near field and a far field.

Additionally, various methods are provided to make a radio frequency identification (RFID) device. In one embodiment, a method of making a radio frequency identification (RFID) device comprises the steps: coupling a pre-manufactured near field only RFID tag to an item, wherein the near field only RFID tag does not function as a far field RFID tag; and coupling a conductive element to the item, wherein the conductive element is adapted to function as a far field antenna; wherein the coupling steps result in that the near field only RFID tag is located in a proximity relationship to the conductive element such that the RFID device functions in both a near field and a far field; and wherein one of the coupling steps comprises removably coupling a respective one of the near field only RFID tag and the conductive element to the item such that the proximity relationship between the near field only RFID tag and the conductive element may be later removed such that the RFID device no longer functions in the far field.

In another embodiment, a method of making a radio frequency identification (RFID) device comprises the steps: coupling, in a first manufacturing process, one of a pre-manufactured near field only RFID tag and a conductive element to an item, wherein the near field only RFID tag does not function as a far field RFID tag, wherein the conductive element is adapted to function as a far field antenna; and coupling, in a second manufacturing process separate from the first manufacturing process, the other of the near field only RFID tag and the conductive element to the item, wherein the coupling steps result in that the near field only RFID tag is located proximate to and coupled in proximity to the conductive element such that the RFID device functions in both a near field and a far field.

The following portion of the specification and supporting figures describes RFID sensors, systems and methods in which RFID devices with decoupled near field only RFID tags and far field antennas are used to implement RFID sensors in accordance with some embodiments. Referring first to FIGS. 18-20, illustrations are shown of an RFID sensor system including an RFID device 1801 having a decoupled near field only RFID tag and far field antenna architecture such as described above and used in a manner to implement an RFID sensor in accordance with some embodiments. The sensor system 1800 includes a near field only RFID tag 1802, a far field antenna 1804 (which may be generically referred to as a conductive element, which is understood to be electrically conducting), an RFID reader 1808 having a reader antenna 1806 and coupled to a controller 1810. Also shown are interrogation signals 1820, return signals 1822 (also referred to as reflected signals or backscattered signals), a near field 1812 and a far field 1814. It is noted that the near field only RFID tag is intended to not function in and of itself as a far field RFID device.

The near field only RFID tag 1802 and the far field antenna 1804 are configured to be selectively movable between at least a first position and a second position, where in a first position (e.g., illustrated in FIG. 18 and FIG. 20), the near field only RFID tag and the far field antenna are located relative to each other such that the far field antenna is substantially decoupled from the near field only RFID tag. When so decoupled, the RFID device 1801 only operates in the near field 1812 with respect to the RFID reader 1808. In this decoupled position, since the near field only RFID tag is not coupled to the far field antenna, the near field only RFID tag does not backscatter the interrogation signals 1820 from the reader 1808 which is in the far field 1814. Thus, the RFID device 1801 is not readable by the RFID reader 1808, as illustrated in FIGS. 18 and 20.

When the near field only RFID tag 1802 and the far field antenna 1804 are located in the second position relative to each other (e.g., illustrated in FIG. 19), the far field antenna is substantially coupled to the near field only RFID tag. When so coupled, the RFID device 1801 operates in both the near field 1812 and the far field 1814 with respect to the RFID reader 1808. In this coupled position, since the near field only RFID tag is coupled to the far field antenna, the near field only RFID tag does receive the interrogation signals 1820 and sends or backscatters the return signals 1822 to the antenna 1806 of the reader 1808 which is in the far field 1814. Thus, the RFID device 1801 is now readable by the RFID reader 1808, as illustrated in FIG. 19.

By selectively moving one or both of the near field only RFID tag 1802 and the far field antenna 1804 relative to each other between coupled and decoupled positions, one can control whether or not the RFID device 1801 can be read by the RFID reader 1808 in the far field 1814. In a sensor system in accordance with some embodiments, one or more of the reading of the RFID device 1801, the non-reading of the RFID device 1801, or the transition between reading and non-reading of the RFID device 1801 by the RFID reader 1808 may be interpreted or correlated by the controller 1810 as a state of the RFID device and/or an occurrence of an event. For example, in some embodiments, the controller correlates the fact that the RFID device 1801 can be read by the reader 1808 (i.e., the RFID device is visible to the reader) to a first state of the RFID device, and correlates the fact that the RFID device 1801 is not read by the reader 1808 (i.e., the RFID device is not visible to the reader) to a second state of the RFID device. In some embodiments, one or both of these states may be correlated by the controller 1810 to the occurrence of first or second events. In some embodiments, the controller 1810 can correlate the point in time when the reading of the RFID device 1801 changes (e.g., becomes readable or becomes unreadable by the reader) with a transition or trigger signaling an occurrence of an event. For example, the controller may detect a transition between movement between the first and second positions by repetitively attempting to read the RFID device 1801. If the RFID device 1801 is repetitively not read, then it is read, the controller 1810 detects that the near field only RFID tag and the far field antenna are now sufficiently coupled so that the RFID device 1801 now functions in the far field. On the other hand, if the RFID device 1801 is repetitively being read, then it is not (i.e., it disappears from the reader perspective), the controller 1810 detects that the near field only RFID tag and the far field antenna are now sufficiently decoupled so that the RFID device 1801 no longer functions in the far field.

It is understood that the near field only RFID tag 1802 stores data, at least a portion of which is modulated onto the reflected signals 1822. When the near field only RFID tag and far field antenna are located to be sufficiently coupled, the reader antenna 1806 receives the reflected signals 1822 and the reader 1808 extracts the modulated data which is forwarded to the controller 1810. In some embodiments, the controller 1810 processes the received data as is known in the art. For example, in some embodiments, at least a portion of the data corresponds to an ID of the RFID device 1801, which is matched by the controller to known IDs in order to determine which RFID device it is reading and/or what type of sensor is being implemented. In some embodiments of a sensor system, the controller is programmed to correlate the reading of RFID devices 1801 with known IDs to certain events or occurrences. Depending on the event, based on the reading of a given RFID device, the controller 1810 may output signaling to other system components or to an operator. In some examples, the reading of an given RFID device 1801 in which the near field only RFID tag and the far field antenna are sufficiently coupled to be read in the far field 1814 may be interpreted by the controller as various states and/or events. Some example events and/or states in an exemplary application of a retail store may include: sensing the opening and/or closing of a door or lid, a trigger for customer assistance, a trigger that replenishment of goods is needed, a trigger than a given RFID device is within range of the reader, a stock location tool, to name a few.

It is noted that in some embodiments, the reader antenna 1806 is located outside of the near field 1812 but within the far field 1814. It is also noted that the reader 1808 and/or controller 1810 may be located within or outside of the far field 1814 as long as the reader antenna 1806 is within the far field 1814.

Figure 21:
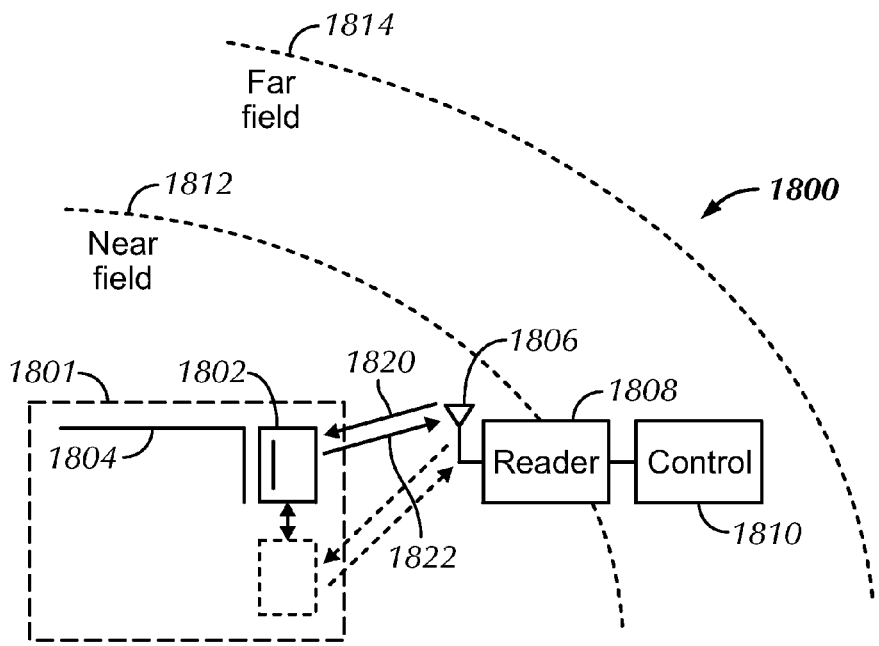
FIG. 21 is an illustration of the RFID sensor system of FIG. 18 in which an antenna of the reader is within a near field in accordance with some embodiments.

Referring next to FIG. 21, shown is an illustration of the RFID sensor system 1800 of FIG. 18 in which the reader antenna 1806 is within the near field 1812 in accordance with some embodiments. In these embodiments, regardless of whether the near field only RFID tag and the far field antenna of the RFID device 1801 are in the coupled position or in the decoupled position, the RFID device 1801 can be read by the reader 1808. In some embodiments, in this configuration, the controller 1810 can be configured to cause the reader 1808 to transmit signaling to the near field only RFID tag 1802 that causes the near field only RFID tag to change at least a portion of its data stored in the near field only RFID tag. This effectively re-programs the near field only RFID tag 1802. Again, is also noted that the reader 1808 and/or controller 1810 may be located within or outside of the near field 1812 as long as the reader antenna 1806 is within the near field 1812.

Additionally, the data or ID stored in the near field only RFID tag 1802 may be re-programmed by the controller 1810 when the reader antenna 1806 is in the far field, but only when the near field only RFID tag and the far field antenna are located relative to each other to be sufficiently coupled, such as shown in FIG. 19.

It is noted that the RFID device 1801 is illustrated to be similar to the near field only RFID tag 1802 and far field antenna 1804 of FIGS. 3D-3F in that they are configured to be capacitively coupled together. It is understood that the RFID device may be electrically and/or magnetically coupled, such as the magnetically coupled near field only RFID tag and far field antenna of FIGS. 3A-3C. The near field only RFID tag and the far field antenna may be any of those described herein and other variations.

It is also noted that although the illustrations of FIGS. 18-21 show the near field only RFID tag moving relative to a stationary far field antenna, other configurations are possible. For example, the far field antenna can be movable relative to a stationary near field only RFID tag, or both the near field only RFID tag and far field antenna move relative to each other to be coupled or not coupled.

In some embodiments, since the near field only RFID tag 1802 may be embodied as a passive device (i.e., no battery power is required), inexpensive RFID-based sensors may be implemented in locations when power is not available. In such cases, RFID-based sensors may be easily implemented in any location by locating the RFID device having the decoupled architecture in a location where it may only be read in the far field. Thus, RFID readers may be positioned at locations where power is available and that are near the locations of devices/movements that are to be sensed. In a large retail environment where merchandise and fixturing frequently move, simple to set up and easily relocatable RFID-based sensors may be implemented using RFID devices that may be moved together with fixed readers. Known user activated switches, call buttons, etc. are often required to be installed at locations where power is available (or alternatively, battery power is required) and such devices can be relatively expensive. It is well known than the basic components of RFID devices readable in the far field by RFID readers are low cost. In particular applications where RFID readers are already implemented for use, RFID based devices may be easily added to create RFID-based sensors.

Furthermore, in some embodiments, the movement of the near field only RFID tag 1802 and the far field antenna 1804 relative to each other occurs through mechanical, physical movement of one or both of the near field only RFID tag and the far field antenna. This movement may be the result of human, physical intervention. For example, a person may press a button, open a door, or otherwise bring to components into proximity, e.g., by sliding, shifting, lifting, pivoting, rotating one or both components. The movement may also be a result of animal or other living being triggering physical movement, such as an animal that pushes a door containing one of the near field only RFID tag and the far field antenna against or a door frame or other component having the other of the near field only RFID tag and the far field antenna. The movement may also be the result of other physical movement triggers. For example, as items are removed from an area by human or machine, components including the near field only RFID tag and far field antenna are brought into a proximity relationship such that they are coupled together to function as a far field RFID device. Additionally, the relative movement of the near field only RFID tag and the far field antenna may be triggered in other ways. For example, in one embodiment, mechanical pressure from a spring loaded member causes a far field antenna and a near field only RFID tag to be brought into proximity as weight is removed from the member or objects resisting spring extension are removed.

Figure 22:
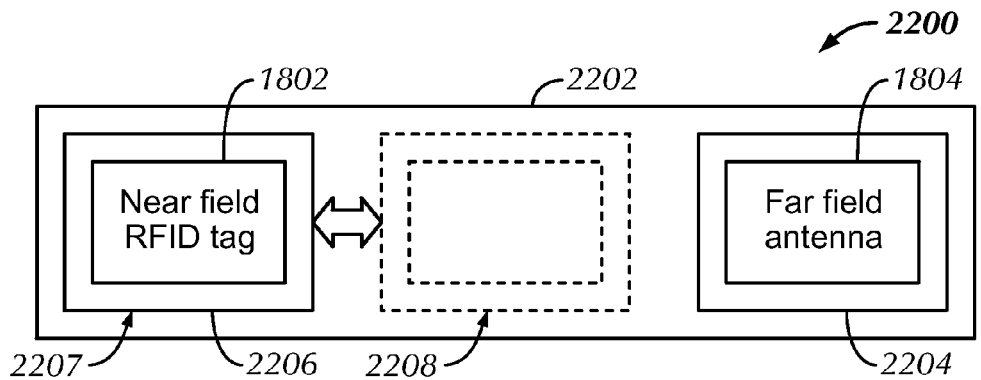
FIGS. 22-24 provide exemplary illustrations of integrated coupling structures in which one or both of the near field only RFID tag and the far field antenna are selectively movable to couple and decouple the near field only RFID tag and the far field antenna in an RFID sensor system in accordance with some embodiments.
Figure 23:
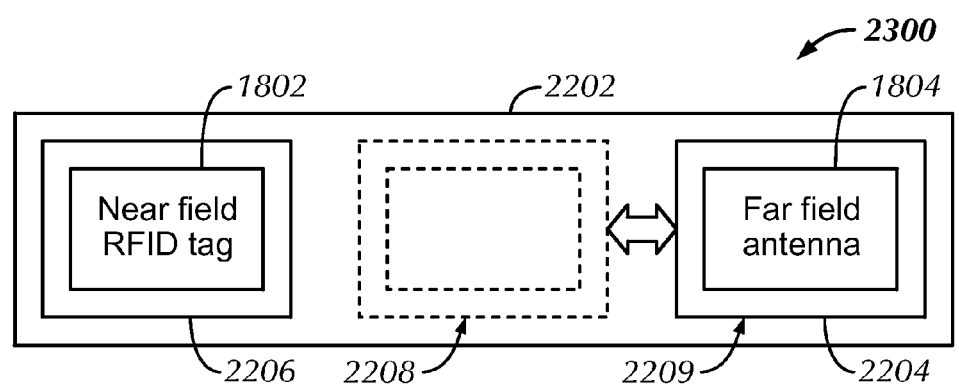
Figure 24:
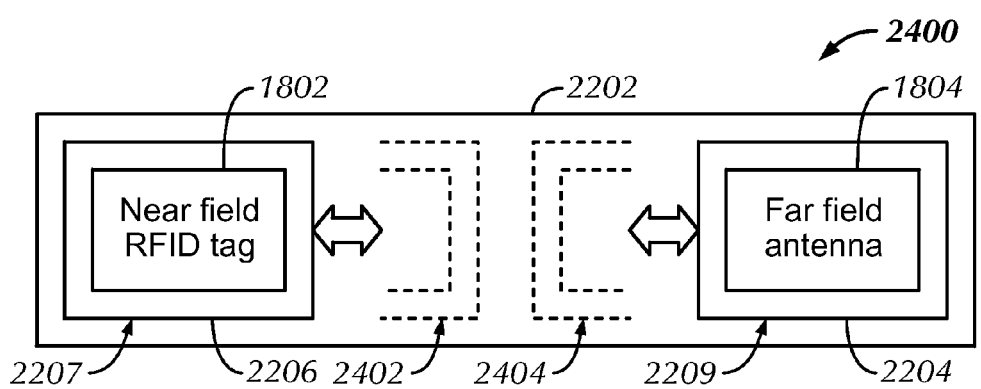

Referring next to FIGS. 22-27, various coupling structures to allow for the relative movement of the near field only RFID tag 1802 and the far field antenna 1804 so that the can be selectively coupled and decoupled are described. In FIGS. 22-24, exemplary coupling structures are shown in which the coupling structure is integrated, for example, in a housing or integrated device.

In FIG. 22, the RFID device 2200 includes coupling structure 2202 which contains the near field only RFID tag 1802 and the far field antenna 1804. The far field antenna is permanently or removably fixed to a first portion 2204 of the coupling structure 2202 whereas the near field only RFID tag 1802 is permanently or removably fixed to a second portion 2206 of the coupling structure 2202. The first portion 2204 is fixed to the coupling structure (or is integral with the coupling structure) such that the far field antenna 1804 does not move. The second portion 2206 is configured to be moveable relative to the coupling structure 2202 and the first portion 2204 to allow the near field only RFID tag to be movable between at least a decoupled position (at location 2207) and a coupled position (at location 2208) proximate the far field antenna. The exact configuration of the coupling structure 2202 and the portions 2204 and 2206, and the components to effect this configuration will depend on the application of the RFID device within the RFID sensor system. For example, in the event the RFID device is implemented as a push button, in some embodiments, the second portion 2206 may be part of the button structure that is movable within a button housing. Many other configurations are possible.

In the embodiments of the RFID device 2300 of FIG. 23, the second portion 2206 of the coupling structure 2202 is fixed to the coupling structure (or is integral with the coupling structure) such that the near field only RFID tag 1802 does not move. The first portion 2204 is configured to be moveable relative to the coupling structure 2202 and the second portion 2206 to allow the far field antenna to be movable between at least a decoupled position (at location 2209) and a coupled position (at location 2208) proximate the near field only RFID tag. Again, the exact configuration of the coupling structure 2202 and the portions 2204 and 2206 will depend on the application of the RFID device within the RFID sensor system.

In the embodiments of the RFID device 2400 of FIG. 24, both the first portion 2204 and the second portion 2206 are configured to be moveable relative to the coupling structure 2202 to allow both the near field only RFID tag and the far field antenna to be movable between at least a decoupled position (at locations 2207 and 2209) and a coupled position (at locations 2402 and 2404). The exact configuration of the coupling structure 2202 and the portions 2204 and 2206 will depend on the application of the RFID device within the RFID sensor system.

It is noted that in some embodiment, when referring to portions of the coupling structure that are integrated, such portions may or may not be contained within or integrated into one housing or assembly and are often directly mechanically fixed together. In some embodiments, the first portion and the second portion are integrated into a single structure.

Figure 25:
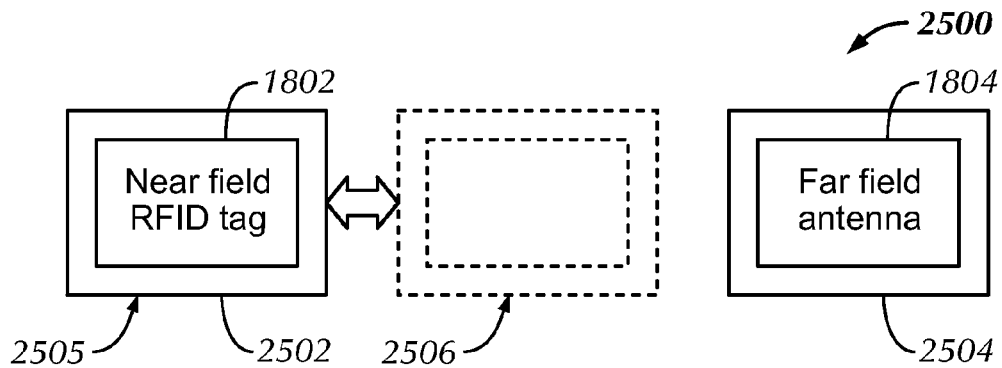
FIGS. 25-27 provide exemplary illustrations of coupling structures implemented as one or more discrete and non-integrated components in which one or both of portions containing the near field only RFID tag and the far field antenna are selectively movable to couple and decouple the near field only RFID tag and the far field antenna in an RFID sensor system in accordance with some embodiments.

In FIG. 25, the RFID device 2500 includes a non-integrated coupling structure to selectively couple and decouple the near field only RFID tag 1802 and the far field antenna. The near field only RFID tag 1802 is permanently or removably fixed to a first portion 2502 of the coupling structure whereas the far field antenna 1804 is permanently or removably fixed to a second portion 2504 of the coupling structure. In this embodiment, the second portion 2504 is positionally fixed such that the far field antenna 1804 does not move. The first portion

2502 is configured to be moveable relative to the second portion 2504 to allow the near field only RFID tag to be selectively movable between at least a decoupled position (at location 2505) and a coupled position (at location 2506) proximate the far field antenna. The exact configuration of the first portion 2502 and the second portion 2504, and the components to effect this configuration will depend on the application of the RFID device within the RFID sensor system. For example, in the event the RFID device is implemented as a door open/close sensor, in some embodiments, the first portion 2502 may be part of the movable door whereas the second portion 2504 may be a part of a fixed separate door frame, door stop or door post, for example. Many other configurations are possible.

Figure 26:
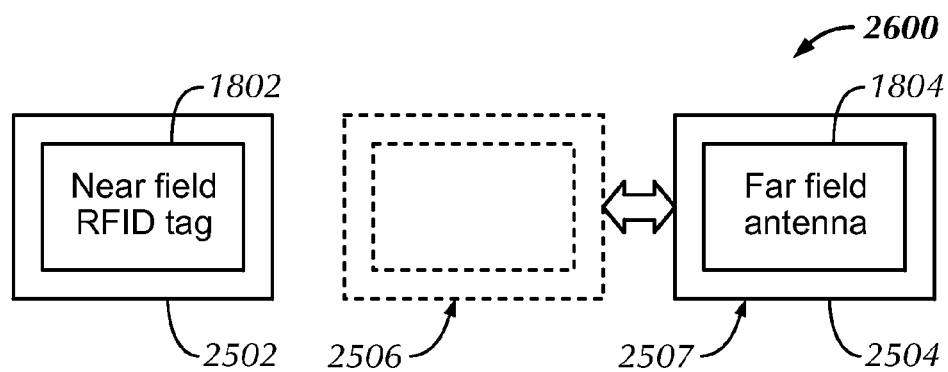

In the embodiments of the RFID device 2600 of FIG. 26, the first portion 2502 is positionally fixed such that the near field only RFID tag 1802 does not move. The second portion 2504 is configured to be moveable relative to the first portion 2502 to allow the far field antenna to be selectively movable between at least a decoupled position (at location 2507) and a coupled position (at location 2506) proximate the near field only RFID tag. The exact configuration of the first portion 2502 and the second portion 2504, and the components to effect this configuration will depend on the application of the RFID device within the RFID sensor system.

Figure 27:
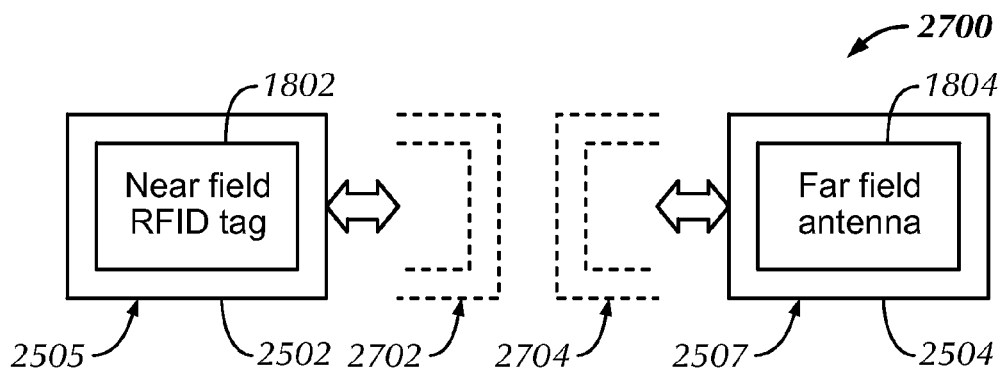

In the embodiments of the RFID device 2700 of FIG. 27, both the first portion 2502 and the second portion 2504 are configured to be moveable relative to each other to allow both the near field only RFID tag and the far field antenna to be selectively movable between at least a decoupled position (at locations 2505 and 2507) and a coupled position (at locations 2702 and 2704). The exact configuration of the first portion 2502 and the second portion 2504, and the components to effect this configuration will depend on the application of the RFID device within the RFID sensor system.

It is noted that in some embodiment, when referring to portions of the coupling structure that are non-integrated, such portions are often not directly mechanically fixed together even though they may be indirectly coupled together by an overall frame or assembly. In some embodiments, the first portion and the second portion are separate physical structures.

It is also noted that when generally referring to portions of coupling structure that are configured to allow one or both of the near field only RFID tag and far field antenna to be moved relative to each other, such movement may be provided by any known physical structures that allow for one or both portions to be depressed, slid, shifted, lifted, pivoted, rotated, peeled and re-adhered, etc. relative to each other for example.

Figure 28:
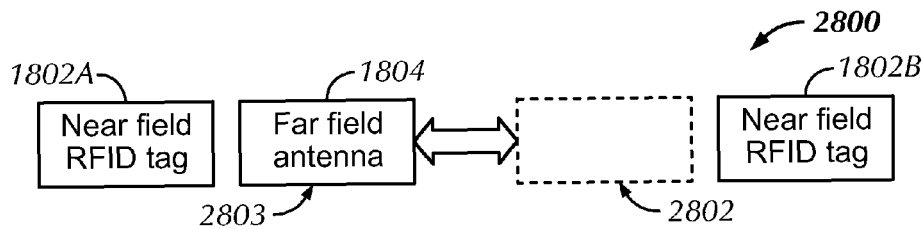
FIG. 28 is an illustration of an RFID device in which a far field antenna may be selectively moved into position to couple with one of two near field only RFID tags for use in an RFID sensor system in accordance with some embodiments.

Referring next to FIG. 28, shown is an illustration of an RFID device 2800 in which the far field antenna 1804 may be selectively moved into position to couple with one of two near field only RFID tags 1802A and 1802B for use in an RFID sensor system in accordance with some embodiments. That is, in some embodiments, the RFID device 2800 includes more than one near field only RFID tag. The far field antenna may be switched or selectively moved so that in one position (at location 2803), the far field antenna is sufficiently coupled to the near field only RFID tag 1802A so that the near field only RFID tag 1802A and the far field antenna 1804 together operate in both the near field and the far field with respect to the RFID reader. In the position of location 2803, the far field antenna 1804 is decoupled from the near field only RFID tag 1802B such that the near field only RFID tag 1802 is only readable by a reader having an antenna in the near field. That is, a reader having an antenna located in the far field can read near field only RFID tag 1802A, but not the near field only RFID tag 1802B.

When the far field antenna 1804 is selectively moved from location 2803 to a second position (at location 2802), the far field antenna 1804 is now coupled to near field only RFID tag 1802B and decoupled with near field only RFID tag 1802A. Thus, a reader having an antenna located in the far field can now read near field only RFID tag 1802B, but not the near field only RFID tag 1802A. In some applications, it may be desirable to be able to alternatively read two different known near field only RFID tags. For example, in a simple swinging door application, the far field antenna 1804 may be fixed to the swinging door, where near field only RFID tag 1802A is fixed to a stationary frame on one side of the door and near field only RFID tag 1802B is fixed to a stationary frame on another side of the door. Depending on which near field only RFID tag is read by the reader will indicate the position of the swinging door. In another example, a push button device may be configured such that the far field antenna 1804 is coupled with near field only RFID tag 1802A when un-pressed, and when pressed, the far field antenna 1804 is moved to be coupled with near field only RFID tag 1802B and no longer be coupled with near field only RFID tag 1802A. Depending on which tag is read, the controller coupled to the reader can determine the switch or button position.

It is noted that for simplicity, the coupling structures are not shown in FIG. 28 (and in FIGS. 29-34), but it is understood that any of the coupling structures and their variations as described herein and otherwise known may be used. It is also understood that the coupling structure may be integrated or non-integrated, such as described herein.

Figure 29:
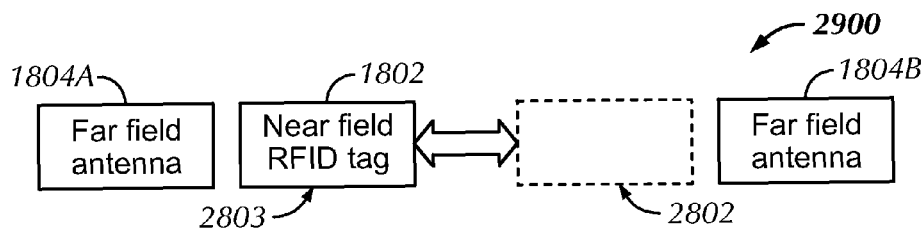
FIG. 29 is an illustration of an RFID device in which a near field only RFID tag may be selectively moved into position to couple with one of two far field antennas for use in an RFID sensor system in accordance with some embodiments.

Referring next to FIG. 29, shown is an illustration of an RFID device 2900 in which the near field only RFID tag 1802 may be selectively moved into position to couple with one of two far field antennas 1804A and 1804B for use in an RFID sensor system in accordance with some embodiments. This embodiment is similar to that described in FIG. 28; however, a single near field only RFID tag 1802 is selectively coupled with one far field antenna then to another. There may be many applications where such architecture is implemented. For example, in some embodiments, the far field antennas 1804A and 1804B may be different types of antennas (e.g., having different polarization characteristics and/or are tuned differently) that can be differentiated by the reader, or read by different readers.

Figure 30:
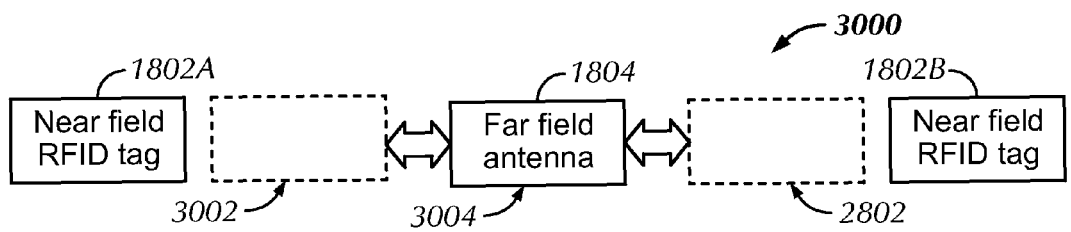
FIG. 30 is an illustration of an RFID device in which a far field antenna may be selectively moved into position to couple with none or one of two near field only RFID tags for use in an RFID sensor system in accordance with some embodiments.

Referring next to FIG. 30, shown is an illustration of an RFID device 3000 in which the far field antenna 1804 may be selectively moved into position to couple with none or one of two near field only RFID tags 1802A and 1802B for use in an RFID sensor system in accordance with some embodiments. This embodiment is similar to that of FIG. 28; however, the device 3000 illustrates that in addition to being located at positions that will couple the far field antenna 1804 to the near field tags 1802A and 1802B (locations 2802 and 3002), the far field antenna 1804 may be selectively movable to other locations (e.g., location 3004) in which the far field antenna is decoupled from all near field tags of the RFID device 3000.

Figure 31:
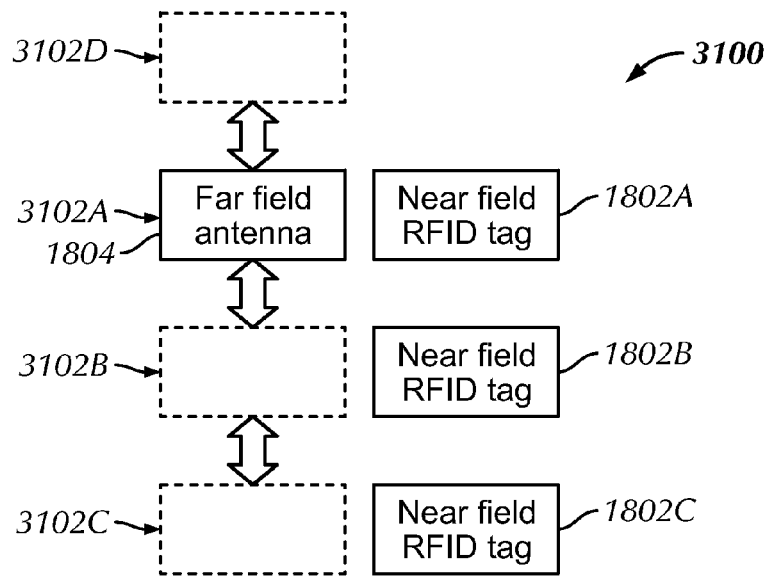
FIG. 31 is an illustration of an RFID device in which a far field antenna may be selectively moved into position to couple with none or any one of a plurality of near field only RFID tags for use in an RFID sensor system in accordance with some embodiments.

Furthermore, referring to FIG. 31, an RFID device 3100 is shown in which the far field antenna 1804 may be selectively moved into position to couple with none or any one of a plurality of near field only RFID tags for use in an RFID sensor system in accordance with some embodiments. Thus, in this embodiment, the RFID based sensor includes an RFID device that has a 1:N far field antenna to near field only RFID tag coupling relationship. In the illustrated embodiment, there are three near field tags 1802A, 1802B and 1802C. As illustrated, the far field antenna 1804 may be selectively moved into at least different positions 3102A-D. In position 3102D, the far field antenna is decoupled with all near field only RFID tags. In position 3102A, the far field antenna is only coupled to near field only RFID tag 1802A such that only near field only RFID tag 1802A can be read by a reader having an antenna in the far field. In position 3102B, the far field antenna is only coupled to near field only RFID tag 1802B such that only near field only RFID tag 1802B can be read by a reader having an antenna in the far field. And, in position 3102C, the far field antenna is only coupled to near field only RFID tag 1802C such that only near field only RFID tag 1802C can be read by a reader having an antenna in the far field. It is understood that one or more of the near field tags 1802A-C may be configured to move relative to the far field antenna 1804. It is also understood that there may be other decoupled locations not illustrated, e.g., between locations 3102A and 3102B. In one example, a spring-loaded member having a far field antenna of a merchandising display or rack moves to different locations as merchandise is removed from rack, and as the member moves the far field antenna is coupled to different near field only RFID tags in order to signal different levels of inventory in the rack. In this example, the RFID based sensor system would sense levels of inventory and when replenishment is needed.

Figure 32:
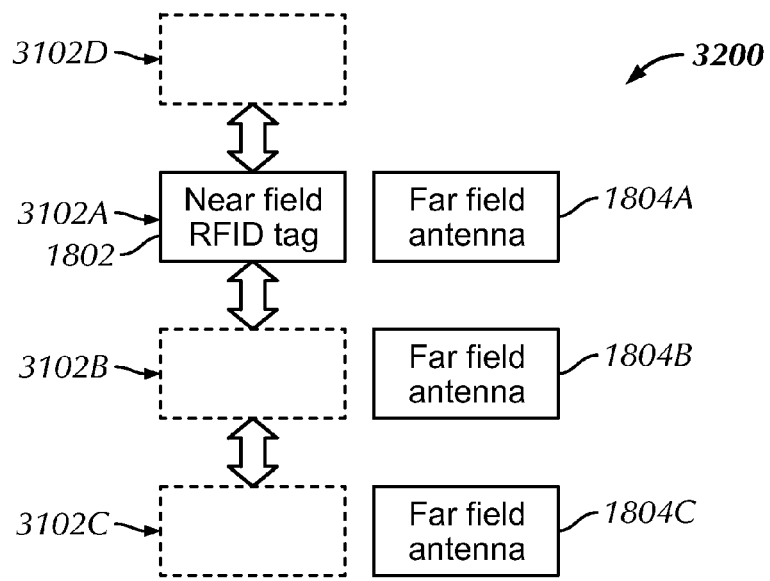
FIG. 32 is an illustration of an RFID device in which a near field only RFID tag may be selectively moved into position to couple with none or any one of a plurality of far field antennas for use in an RFID sensor system in accordance with some embodiments.

Referring next to FIG. 32, shown is an illustration of an RFID device 3200 in which the near field only RFID tag 1802 may be selectively moved into position to couple with none or any one of a plurality of far field antennas for use in an RFID sensor system in accordance with some embodiments. Thus, in this embodiment, the RFID based sensor includes an RFID device that has a 1:N near field only RFID tag to far field antenna coupling relationship. In the illustrated embodiment, there are three far field antennas 1804A, 1804B and 1804C. As illustrated, the near field only RFID tag 1802 may be selectively moved into at least different positions 3102A-D. In position 3102D, the near field only RFID tag is decoupled with all far field antennas. In position 3102A, the near field only RFID tag is only coupled to far field antenna 1804A such that near field only RFID tag 1802 can only be read by a reader in communication with far field antenna 1804A. In position 3102B, the near field only RFID tag is only coupled to far field antenna 1804B such that near field only RFID tag 1802 can only be read by a reader in communication with far field antenna 1804B. And, in position 3102C, the near field only RFID tag 1802 is only coupled to far field antenna 1804C such that near field only RFID tag 1802 can only be read by a reader in communication with far field antenna 1804C. It is understood that one or more of the far field antennas 1804A-C may be configured to move relative to the near field only RFID tag 1802. It is also understood that there may be other decoupled locations not illustrated, e.g., between locations 3102A and 3102B.

It is noted that in some embodiments of the devices 3100 and 3200 of FIGS. 31 and 32, a coupling structure is provided such that the order of movement from the coupling of a given near field only RFID tag to a given far field antenna and so on may be different than is illustrated.

Figure 33:
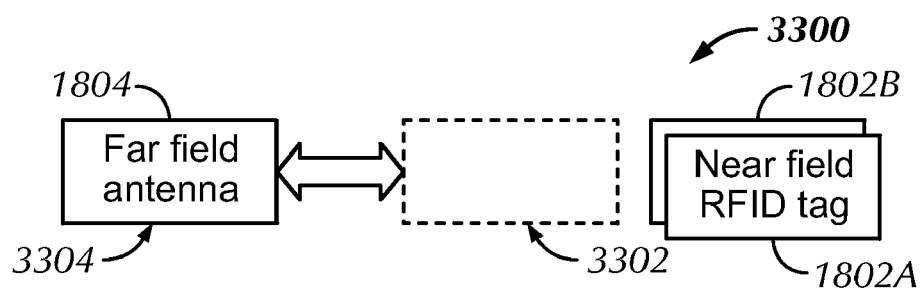
FIG. 33 is an illustration of an RFID device in which a far field antenna may be selectively moved into position to couple with two near field only RFID tags at the same time for use in an RFID sensor system in accordance with some embodiments.

Referring next to FIG. 33, shown is an illustration of an RFID device 3300 in which the far field antenna 1804 may be selectively moved into position to couple with two near field only RFID tags 1802A and 1802B at the same time for use in an RFID sensor system in accordance with some embodiments. Similar to the embodiments of FIGS. 23 and 26, the far field antenna 1804 is movable; however, it is movable to couple at the same time to two or more near field tags 1802A and 1802B. In this way, when the far field antenna 1804 is located at position 3304, the far field antenna 1804 is decoupled from the near field only RFID tags so that neither may be read by a reader having an antenna in the far field. When the far field antenna 1804 is selectively positioned to location 3302, the far field antenna 1804 is coupled to both near field only RFID tags 1802A and 1802B so that they both may be read by a reader having an antenna in the far field. There may be several applications in which it is desired to have more than one near field only RFID tag readable in the far field, and at a minimum, may be provided for redundancy in tag reading.

Alternatively, it is understood that the far field antenna 1804 may be positionally fixed and the two tags 1802A and 1802B are movable, or that both the far field antenna 1804 and the tags 1802A and 1802B move relative to each other.

Figure 34:
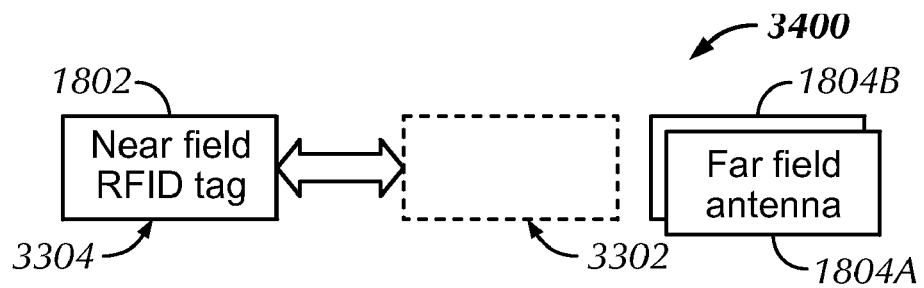
FIG. 34 is an illustration of an RFID device in which a near field only RFID tag may be selectively moved into position to couple with two far field antennas at the same time for use in an RFID sensor system in accordance with some embodiments.

Referring next to FIG. 34, shown is an illustration of an RFID device 3400 in which the near field only RFID tag 1802 may be selectively moved into position to couple with two far field antennas 1804A and 1804B at the same time for use in an RFID sensor system in accordance with some embodiments. Similar to the embodiments of FIGS. 22 and 25, the near field only RFID tag 1802 is movable; however, it is movable to couple at the same time to two or more far field antennas 1804A and 1804B. In this way, when the near field only RFID tag 1802 is located at position 3304, the near field only RFID tag 1802 is decoupled from the far field antennas so that the near field only RFID tag 1802 may not be read by a reader having an antenna in the far field. When the near field only RFID tag 1802 is selectively positioned to location 3302, the near field only RFID tag 1802 is coupled to both far field antennas 1804A and 1804B so that the tag 1802 may be read by one or more readers having one or more antennas in the far field in communication with the far field antennas 1804A and 1804B. There may be several applications in which it is desired to have one near field only RFID tag 1802 readable in the far field using more than one far field antenna. Alternatively, it is understood that the near field only RFID tag 1802 may be positionally fixed and the two antennas 1804A and 1804B are movable, or that both the near field only RFID tag 1802 and the antennas 1804A and 1804B move relative to each other.

It is also noted that while the illustrations of FIGS. 19-34 show discrete locational positions in which the near field only RFID tag 1802 and far field antenna 1804 are coupled and decoupled, there may be more than one position in which the near field only RFID tag and the far field antenna are coupled together. Additionally, in some embodiments, there may more than one position in which the near field only RFID tag and the far field antenna are decoupled. For example, in some embodiments, a coupling structure could be provided that allows multiple discrete positional locations, one or more of which provide a coupling between the near field only RFID tag and the far field antenna, and one or more of which provide that the near field only RFID tag and the far field antenna are decoupled. In other embodiments, the coupling structure is configured such that there may be multiple non-discrete decoupling positions. For example, in a swinging door application, at approximately certain locational positions, the near field only RFID tag and the far field antenna will be coupled, whereas at multiple locational positions through the continuous movement of the door when swinging open or closed, that the near field only RFID tag and the far field antenna will be decoupled in which case the RFID device can not be read by a reader having an antenna in the far field.

Figure 35:
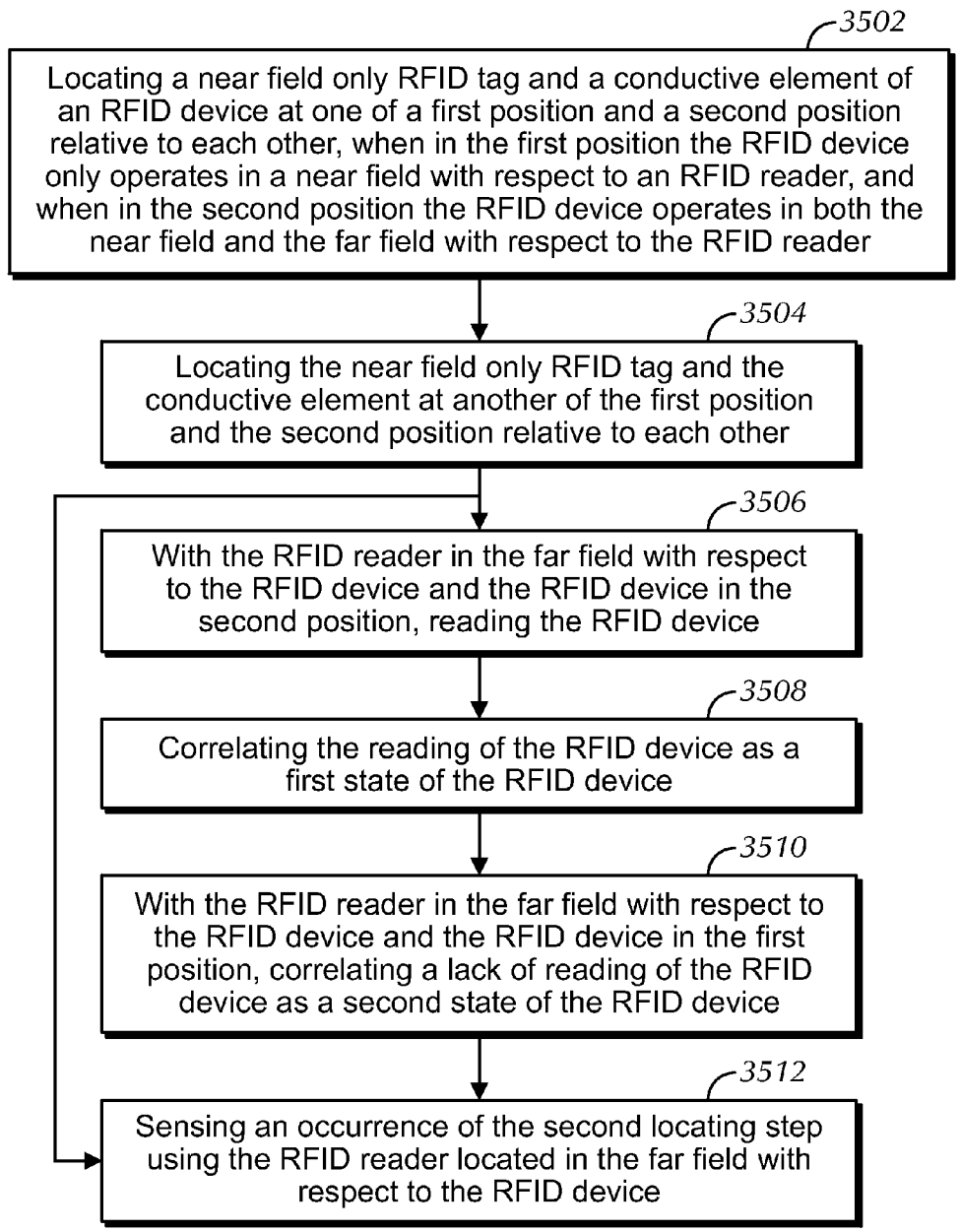
FIG. 35 is a flowchart illustrating the steps involved in an RFID sensor system in accordance with some embodiments.

Referring next to FIG. 35, shown is a flowchart illustrating the steps involved methods performed in an RFID sensor system in accordance with some embodiments. Embodiments of the methods may be performed using any of the RFID devices described herein having an architecture in which the near field only RFID tag and the far field antenna may be selectively coupled and decoupled. It is understood that the methods of these embodiments may also be performed by components, systems and variations not specifically described herein.

In accordance with some embodiments, a near field only RFID tag and a conductive element of an RFID device are located at one of a first position and a second position relative to each other, when in the first position the RFID device only operates in a near field with respect to an RFID reader, and when in the second position the RFID device operates in both the near field and the far field with respect to the RFID reader (Step 3502). This may be done in a variety of ways using a variety of possible coupling structures such as described herein. For example, in some embodiments, one or both of the near field only RFID tag and the far field antenna are movable relative to the other to locate the near field only RFID tag and the far field antenna in either the first position or the second position. In some embodiments, the locating may be the result of user mechanical manipulation or other living being mechanical manipulation of coupling structure fixed to the near field only RFID tag and the far field antenna.

When in the first position, in one embodiment, the near field only RFID tag and the far field antenna are located relative to each other such that the far field antenna is sufficiently decoupled from the near field only RFID tag in order that the RFID device only operates in a near field with respect to an RFID reader having an antenna in the far field. When in the second position, in one embodiment, the near field only RFID tag and the far field antenna are located relative to each other such that the far field antenna is sufficiently coupled to the near field only RFID tag such that the RFID device may be read by a reader having an antenna in the far field.

Next, the near field only RFID tag and the conductive element are located at another of the first position and the second position relative to each other (Step 3504). In some embodiments, this involves physically moving one or both of the near field only RFID tag and the far field antenna relative to each other such that they are located in the other of the first position and the second position. Any coupling structure described herein or otherwise capable of allowing or triggering this locating step may be used.

Next, the RFID device is read with an RFID reader having an antenna in the far field with respect to the RFID device and the RFID device is in the second position (Step 3506). For example, this is done in some embodiments by causing the transmission of interrogation signals from the RFID reader which are reflected by the RFID device in the second position. The reflected signals are received by the reader antenna and passed to the RFID reader, which extracts data in the reflected signals from the RFID device. In some embodiments, a control circuit or controller coupled to the RFID reader receives this data from the RFID device, matches at least a portion thereof to a known ID stored in memory of the control circuit to verify that the known RFID device has now been read.

Next, the reading of the RFID device is correlated as a first state of the RFID device (Step 3508). For example, in some embodiments, this step can be performed by the control circuit which has been configured to correlate the reading of the RFID device to a predetermined state of the RFID device. In some embodiments, the state of the RFID device may represent that the RFID device is open, closed, activated, off, etc.

Next, the lack of reading the RFID device in the first position with the RFID reader having an antenna in the far field is correlated as a second state of the RFID device (Step 3510). For example, in some embodiments, this step can be performed by the control circuit which has been configured to correlate the non-reading of the RFID device to a predetermined state of the RFID device. In some embodiments, the state of the RFID device may represent that the RFID device is open, closed, activated, off, etc. In some embodiments, the second state is opposite the first state. It is noted that in some embodiments, Step 3510 is performed before Steps 3506 and 3508.

Next, and/or after Step 3504, an occurrence of the second locating step is detected using the RFID reader located in the far field with respect to the RFID device (Step 3512). In some embodiments, this is detected by a changing on the reading status of the RFID device. That is, responsive to repeated attempts to read the RFID device, it is read, but then the device is suddenly no longer read in the far field by the RFID reader, this is interpreted or correlated as a locating of the near field only RFID tag and the far field antenna relative to each other from the second position to the first position. Furthermore, responsive to repeated attempts to read the RFID device, it is not read, but then suddenly read in the far field by the RFID reader, this is interpreted or correlated as a locating of the near field only RFID tag and the far field antenna relative to each other from the first position to the second position. Depending on the configuration corresponding to the RFID device being read or not, the locating is correlated to the occurrence of an event. Examplary events may include the opening of a door, the closing of a door, the activation is an alarm or use help button, for example.

It is further noted that the methods embodied in the process of FIG. 35 may apply to one or more of the embodiments in which the sensor system includes more than one near field only RFID tag or more than one far field antenna in which coupling and decoupling may selectively occur with one or more other components at the same or different points in time, such as those embodiments described in connection with FIGS. 28-34.

Figure 36:
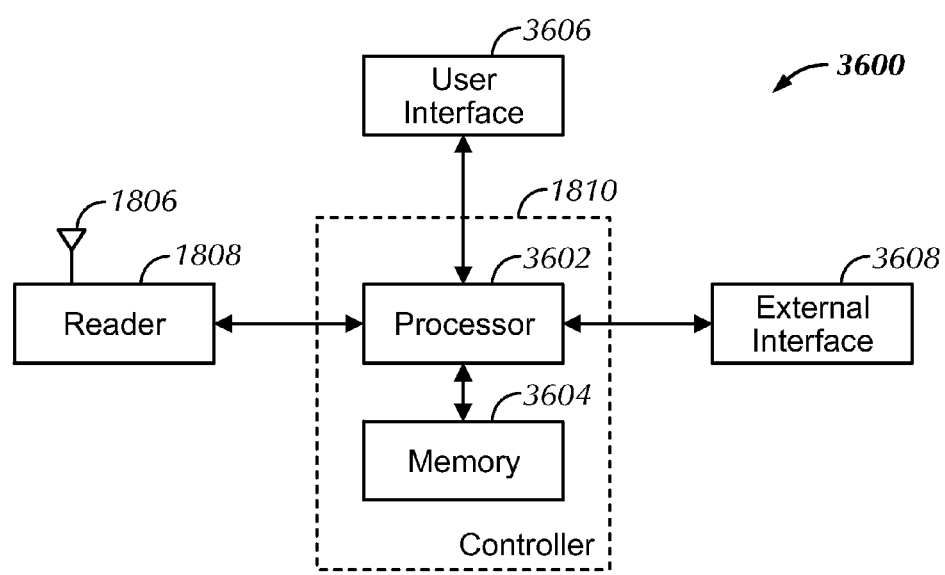
FIG. 36 is a functional block diagram of components of an RFID reader and controller in accordance with some embodiments.

The above-described processes are readily enabled using any of a wide variety of available and/or readily configured control platforms, including partially or wholly programmable platforms as are known in the art or dedicated purpose platforms as may be desired for some applications. Referring now to FIG. 36, shown is a functional block diagram of components of an RFID reader and controller in accordance with some embodiments. Illustrated is the reader antenna 1806 coupled to the RFID reader 1808 which is coupled to the controller 1810 (or control circuit 1810 or microcontroller 1810). The controller 1810 includes at least one processor 3602 and at least one memory 3604. The controller 1810 is also coupled to a user interface 3606 and/or an external interface 3608.

The controller 1810 can comprise a fixed-purpose controller or a partially or wholly programmable controller including the processor 3602 and at least one memory 3604. In some embodiments, the memory 3604 stores executable program code or instructions that when executed by the processor 3602 cause the controller 1810 to carry out one or more of the steps, actions, or functionality as described herein. Additionally, the memory 3604 can serve to store working data and set up or sensor configuration parameters, e.g., parameters that define the ID of near field only RFID tags that will be used as sensors, parameters that define the type of sensor with state/event correlation information, parameters defining subsequent notifications and/or actions to be taken responsive to certain states/events, etc.

So configured, for example, this controller 1810 can cause the RFID tag reader 1808 (or readers) to transmit interrogation signals via the antenna 1806 and to receive and process reflected signals received at the antenna 1806. Furthermore, the controller can be configured through execution of program code by the processor to perform various correlations described herein, such as the determination of state/s of the RFID device, the occurrence of event/s based on the reading or not reading of the RFID device, the determination of the transition of the RFID device between coupled and decoupled positioning of the near field only RFID tag and the far field antenna.

In some embodiments, the user interface 3606 provides an interface to load or program data or parameters regarding RFID tag IDs or data that will be assigned as RFID sensors. In this way, the memory of the controller 1810 is programmed with settings and data so that the controller can interpret read or not read RFID devices to correlate states and/or events. In some case, a detected event will trigger the outputting of a command or other signal to the user interface to notify the user of a condition that may require further action. For example, in the event the reading of a given tag by a reader having an antenna in the far field is correlated to a condition that a customer has requested help in an area of a retail store, for example, the controller 1810 can output an notification to store employees to provide such assistance. Such notifications may be displayed on a display screen or coupled to a network (e.g., using the external interface 3608). In some embodiments, the reading of an RFID device in which the near field only RFID tag and the far field antenna have been located to be read in the far field may trigger an alarm or otherwise indicate that a door is open that should be closed, for example. Personnel can be alerted to such conditions through signaling output by the controller 1810 and further processed by the device/s receiving this signaling.

Such an apparatus may be comprised of a plurality of physically distinct elements as is suggested by the illustration shown in FIG. 36. It is also possible, however, to view this illustration as comprising a logical view, in which case one or more of these elements can be enabled and realized via a shared platform.

In some embodiments, RFID based sensors can leverage reader infrastructure set up in applications in implementing carton level and item level tagging, and provide inexpensive, indirectly-powered and flexible RFID devices that can be easily located in a region. The use of RFID sensors of some embodiments will allow unique sensing opportunities within a carton level or item level tagging application. The use of such sensor systems may lead to improved efficiencies in a retail environment allowing for better control of inventory and items in a salesfloor, possibly leading to overall retailer savings, such saving possibly passed to consumers in improved availability of products and lower consumer prices.

Furthermore, the described features, structures, or characteristics of the invention may be combined in any suitable manner in one or more embodiments. In the foregoing description, numerous specific details are provided to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

While the invention herein disclosed has been described by means of specific embodiments, examples and applications thereof, numerous modifications and variations could be made thereto by those skilled in the art without departing from the scope of the invention set forth in the claims.

What is claimed is:

1. A radio frequency identification (RFID) sensor system comprising:
an RFID device comprising:
a near field only RFID tag, wherein the near field only RFID tag in and of itself does not function as a far field RFID tag;
a conductive element independent from the near field only RFID tag and configured to function as a far field antenna; and
a coupling structure coupled to the near field only RFID tag and the conductive element, wherein the coupling structure is configured to selectively locate the near field only RFID tag and the conductive element in at least a first position and a second position relative to each other;
wherein the first position locates the near field only RFID tag and the conductive element relative to each other such that the conductive element is sufficiently decoupled from the near field only RFID tag in order that the RFID device only operates in a near field with respect to an RFID reader; and
wherein the second position locates the near field only RFID tag and the conductive element relative to each other such that the conductive element is sufficiently coupled to the near field only RFID tag such that the RFID device operates in both the near field and a far field with respect to the RFID reader.

2. The system of claim 1 further comprising:
the RFID reader located within the far field and outside of the near field with respect to the RFID device, the RFID reader configured to read the RFID device only when the coupling structure locates the near field only RFID tag and the conductive element in the second position when the RFID device operates in both the near field and the far field; and
a controller coupled to the RFID reader and configured to receive signaling from the RFID reader and correlate a reading of the RFID device to a first state of the RFID device.

3. The system of claim 2 wherein the controller is configured to correlate the first state of the RFID device to an occurrence of a first event.

4. The system of claim 2 wherein, when the near field only RFID tag and the conductive element are in the first position, the controller is configured to correlate a lack of the signaling received from the RFID reader corresponding to the RFID device to a second state of the RFID device.

5. The system of claim 4 wherein the controller is configured to correlate the second state of the RFID device to an occurrence of a second event.

6. The system of claim 2 wherein the near field only RFID tag stores data that is communicated to the RFID reader when the near field only RFID tag and the conductive element are in the second position.

7. The system of claim 6 wherein the controller is configured to process at least a portion of the data from the RFID device and correlate the at least a portion of the data to the first state of the RFID device.

8. The system of claim 1 further comprising:
the RFID reader located in the near field with respect to the RFID device, the RFID reader and configured to read the RFID device when the coupling structure locates the near field only RFID tag and the conductive element in at least one or both of the first position and the second position; and a controller coupled to the RFID reader and configured to receive signaling from the RFID reader.

9. The system of claim 1 wherein the RFID reader is located within the far field and outside of the near field with respect to the RFID device, wherein the controller is configured to sense an occurrence of a transition of between the first position and the second position.

10. The system of claim 9 wherein the controller is configured to correlate to the occurrence of the transition to an occurrence of an event.

11. The system of claim 1 wherein the coupling structure comprises:
a first portion coupled to the near field only RFID tag; and
a second portion coupled to the conductive element,
wherein one or both of the first portion and the second portion are configured to be physically movable to locate the near field only RFID tag and the conductive element between at least the first position and the second position.

12. The system of claim 11 wherein one of the first portion and the second portion is stationary and another of the first portion and the second portion is configured to be movable to locate the near field only RFID tag and the conductive element in at least the first position and the second position relative to each other.

13. The system of claim 11 wherein the first portion and the second portion are each configured to be movable relative to each other to locate the near field only RFID tag and the conductive element in at least the first position and the second position relative to each other.

14. The system of claim 11 wherein the first portion and the second portion are separate physical structures.

15. The system of claim 11 wherein the first portion and the second portion are integrated into a single structure.

16. The system of claim 1 wherein the first position may be at one or more of a plurality of locations.

17. The system of claim 1 wherein the near field and the far field are defined as a function of interrogation signals from the RFID reader having a frequency selected from one of the following frequency bands: a low frequency (LF) band of about 125-134 kHz, a high frequency (HF) band including 13.56 MHz, an ultra high frequency (UHF) band of about at 860-960 MHz, and a microwave frequency band of about 2.4 and 5.8 GHz.

18. The system of claim 1 wherein the coupling structure is configured to magnetically or capacitively couple the conductive element to the near field only RFID tag when in the second position.

19. The system of claim 1 wherein the coupling structure is configured to electrically couple the conductive element to the near field only RFID tag when in the second position.

20. The system of claim 1 wherein the near field is defined as a first region about the RFID device within one full wavelength of a carrier wave of interrogation signals from the RFID reader and the far field is defined as a second region about the RFID device beyond one full wavelength of the carrier wave.

21. A method for using a radio frequency identification (RFID) device as a sensor comprising:
locating a near field only RFID tag and a conductive element of an RFID device at one of a first position and a second position relative to each other, wherein the near field only RFID tag in and of itself does not function as a far field RFID tag, wherein the conductive element is configured to function as a far field antenna,
wherein the first position locates the near field only RFID tag and the conductive element relative to each other such that the conductive element is sufficiently decoupled from the near field only RFID tag in order that the RFID device only operates in a near field with respect to an RFID reader,
wherein the second position locates the near field only RFID tag and the conductive element relative to each other such that the conductive element is sufficiently coupled to the near field only RFID tag such that the RFID device operates in both the near field and the far field with respect to the RFID reader; and
locating the near field only RFID tag and the conductive element at another of the first position and the second position relative to each other.

22. The method of claim 21 further comprising:
reading, in response to the locating the near field only RFID tag and the conductive element at the second position, the RFID device using the RFID reader located in the far field and outside of the near field with respect to the RFID device,
wherein the RFID reader can not read the RFID device when the near field only RFID tag and the conductive element are in the first position.

23. The method of claim 22 further comprising:
correlating the reading of the RFID device as a first state of the RFID device.

24. The method of claim 22 further comprising:
determining an occurrence of a first event based on the first state.

25. The method of claim 22 further comprising:
correlating, in response to the locating the near field only RFID tag and the conductive element at the first position, a lack of reading of the RFID device as a second state of the RFID device.

26. The method of claim 25 further comprising:
determining an occurrence of a second event based on the second state.

27. The method of claim 22 further comprising:
reading, in response to the locating the near field only RFID tag and the conductive element at one or both of the first position and the second position, the RFID device using the RFID reader located in the near field with respect to the RFID device.

28. The method of claim 21 further comprising sensing an occurrence of the second locating step using the RFID reader located in the far field and outside of the near field with respect to the RFID device.

29. The method of claim 28 further comprising correlating the occurrence of the second locating step to an occurrence of an event.

30. The method of claim 21 wherein the locating the near field only RFID tag and the conductive element at the other of the first position and the second position step comprises:
physically moving one or both of the near field only RFID tag and the conductive element relative to each other to the other of the first position and the second position.

31. The method of claim 21 wherein the locating the near field only RFID tag and the conductive element at the other of the first position and the second position step comprises:
physically moving one of the near field only RFID tag and the conductive element while the other of the near field only RFID tag and the conductive element is stationary to the other of the first position and the second position.

32. The method of claim 21 wherein the near field and the far field are defined as a function of interrogation signals from the RFID reader having a frequency selected from one of the following frequency bands: a low frequency (LF) band of about 125-134 kHz, a high frequency (HF) band including 13.56 MHz, an ultra high frequency (UHF) band of about at 860-960 MHz, and a microwave frequency band of about 2.4 and 5.8 GHz.

33. The method of claim 21 wherein when in the second position, the conductive element is magnetically or capacitively coupled to the near field only RFID tag such that the RFID device operates in both the near field and the far field with respect to the RFID reader.

34. The method of claim 21 wherein when in the first position, the conductive element is electrically coupled to the near field only RFID tag such that the RFID device operates in both the near field and the far field with respect to the RFID reader.

* * * * *